(12) United States Patent
Lande et al.

(10) Patent No.: US 7,467,452 B2
(45) Date of Patent: *Dec. 23, 2008

(54) METHOD FOR APPLYING FLOWABLE MATERIALS

(75) Inventors: Maurice Lande, Bloomfield Hills, MI (US); Michael J. Czaplicki, Rochester, MI (US)

(73) Assignee: Zephyros, Inc., Romeo, MI (US)

( * ) Notice: Subject to any disclaimer, the term of this patent is extended or adjusted under 35 U.S.C. 154(b) by 65 days.

This patent is subject to a terminal disclaimer.

(21) Appl. No.: 11/339,431

(22) Filed: Jan. 25, 2006

(65) Prior Publication Data

US 2006/0127584 A1    Jun. 15, 2006

Related U.S. Application Data

(63) Continuation of application No. 10/342,025, filed on Jan. 14, 2003, now Pat. No. 7,043,815.

(60) Provisional application No. 60/351,967, filed on Jan. 25, 2002.

(51) Int. Cl.
*B29C 47/92* (2006.01)

(52) U.S. Cl. ............ 29/407.09; 29/458; 29/527.1; 29/527.2; 427/409; 425/149; 425/162; 425/192 R

(58) Field of Classification Search ............ 29/458, 29/527.1, 527.2, 709, 714, 430, 460, 783, 29/785, 791, 792, 890.142, 407.01, 407.02, 29/407.05, 407.09; 427/409, 314, 318; 425/192 R, 425/145, 162, 170; 901/1, 31, 41, 43; 700/123, 700/196, 306

See application file for complete search history.

(56) References Cited

U.S. PATENT DOCUMENTS

| | | | |
|---|---|---|---|
| 4,083,384 A | 4/1978 | Horne et al. | |
| 4,399,174 A | 8/1983 | Tanaka et al. | |
| 4,437,046 A | * 3/1984 | Faillace | 318/571 |
| 4,448,736 A | * 5/1984 | Emery et al. | 264/40.1 |
| 4,610,836 A | 9/1986 | Wycech | |
| 4,813,690 A | 3/1989 | Coburn, Jr. | |
| 4,853,270 A | 8/1989 | Wycech | |
| 4,922,596 A | 5/1990 | Wycech | |
| 4,923,902 A | 5/1990 | Wycech | |

(Continued)

FOREIGN PATENT DOCUMENTS

| | | |
|---|---|---|
| DE | 299 04 705 U1 | 7/1999 |
| EP | 0 588 182 A2 | 3/1994 |
| EP | 0 748 683 A2 | 6/1996 |
| EP | 0 748 682 A | 12/1996 |
| EP | 0 755 768 A | 1/1997 |

(Continued)

OTHER PUBLICATIONS

Copending U.S. Appl. No. 09/939,245, filed Aug. 24, 2001.

(Continued)

*Primary Examiner*—Jermie E Cozart
(74) *Attorney, Agent, or Firm*—Dobrusin & Thennisch PC

(57) ABSTRACT

Methods and apparatuses are disclosed for applying melt flowable materials to components of articles of manufacture. The methods and apparatuses disclosed herein are concerned with formation of appropriate flowable materials, control over the manner in which the flowable materials are applied, treatment of the components prior to application of the flowable materials and the like. Moreover, the apparatuses and methods may be particularly suited for applying flowable materials to surfaces and components found in automotive, aerospace, and marine vehicles.

17 Claims, 8 Drawing Sheets

U.S. PATENT DOCUMENTS

| | | | |
|---|---|---|---|
| 4,978,562 A | 12/1990 | Wycech |
| 5,085,021 A | 2/1992 | Kuhnert |
| 5,124,186 A | 6/1992 | Wycech |
| 5,266,133 A | 11/1993 | Hanley et al. |
| 5,336,349 A | 8/1994 | Cornils et al. |
| 5,358,397 A | 10/1994 | Ligon et al. |
| 5,382,397 A | 1/1995 | Turner, Jr. |
| 5,507,994 A | 4/1996 | Cornils et al. |
| 5,544,930 A | 8/1996 | Stedman |
| 5,554,325 A | 9/1996 | Kotte et al. |
| 5,693,174 A | 12/1997 | Nakata et al. |
| 5,755,486 A | 5/1998 | Wycech |
| 5,766,719 A | 6/1998 | Rimkus |
| 5,846,465 A | 12/1998 | Tsujino et al. |
| 5,878,784 A | 3/1999 | Sales et al. |
| 5,932,680 A | 8/1999 | Heider |
| 6,030,701 A | 2/2000 | Johnson et al. |
| 6,053,210 A | 4/2000 | Chapman et al. |
| 6,093,358 A | 7/2000 | Schiewe et al. |
| 6,103,341 A | 8/2000 | Barz et al. |
| 6,135,541 A | 10/2000 | Geise et al. |
| 6,253,819 B1 | 7/2001 | Frendle et al. |
| 6,254,488 B1 | 7/2001 | Hill |
| 6,270,600 B1 | 8/2001 | Wycech |
| 6,321,793 B1 | 11/2001 | Czaplicki et al. |
| 6,383,610 B1 | 5/2002 | Barz et al. |
| 6,389,775 B1 | 5/2002 | Steiner et al. |
| 6,406,078 B1 | 6/2002 | Wycech |
| 6,419,305 B1 | 7/2002 | Larsen |
| 6,444,713 B1 | 9/2002 | Pachl et al. |
| 6,467,834 B1 | 10/2002 | Barz et al. |
| 6,471,285 B1 | 10/2002 | Czaplicki et al. |
| 6,482,486 B1 | 11/2002 | Czaplicki et al. |
| 6,533,866 B1 * | 3/2003 | Franz et al. ............... 118/712 |
| 6,550,847 B2 | 4/2003 | Honda et al. |
| 6,561,571 B1 | 5/2003 | Brennecke |
| 6,607,831 B2 | 8/2003 | Ho et al. |
| 6,634,698 B2 | 10/2003 | Kleino |
| 6,668,457 B1 | 12/2003 | Czaplicki |
| 6,752,451 B2 | 6/2004 | Sakamoto |
| 6,811,864 B2 | 11/2004 | Czaplicki et al. |
| 6,820,923 B1 | 11/2004 | Bock |
| 7,004,536 B2 | 2/2006 | Wieber |
| 7,041,193 B2 | 5/2006 | Bogert et al. |
| 7,043,815 B2 | 5/2006 | Lande et al. |
| 7,180,027 B2 | 2/2007 | Hable et al. |
| 2001/0042353 A1 | 11/2001 | Honda et al. |
| 2002/0066254 A1 | 6/2002 | Ebbinghaus |
| 2002/0164450 A1 | 11/2002 | Lupini et al. |
| 2003/0140671 A1 | 7/2003 | Lande et al. |
| 2003/0184121 A1 | 10/2003 | Czaplicki et al. |
| 2003/0201572 A1 | 10/2003 | Coon et al. |
| 2003/0209921 A1 | 11/2003 | Coon et al. |
| 2004/0011282 A1 | 1/2004 | Myers et al. |
| 2004/0018353 A1 | 1/2004 | Czaplicki et al. |
| 2004/0046423 A1 | 3/2004 | Wieber |
| 2004/0135058 A1 | 7/2004 | Wycech |
| 2004/0180206 A1 | 9/2004 | Czaplicki et al. |
| 2004/0195817 A1 | 10/2004 | Tarbutton et al. |
| 2004/0262810 A1 | 12/2004 | Barz et al. |
| 2004/0262853 A1 | 12/2004 | Larsen et al. |
| 2005/0217785 A1 | 10/2005 | Hable et al. |
| 2005/0268454 A1 | 12/2005 | White |
| 2005/0285292 A1 | 12/2005 | Mendiboure et al. |
| 2006/0144513 A1 | 7/2006 | Bogert et al. |

FOREIGN PATENT DOCUMENTS

| | | |
|---|---|---|
| EP | 0 775 721 A1 | 5/1997 |
| EP | 1 182 087 A2 | 2/2002 |
| EP | 1 428 744 | 6/2004 |
| EP | 1 134 314 B1 | 9/2004 |
| EP | 1 471 105 A2 | 10/2004 |
| FR | 1 518 739 | 12/1975 |
| GB | 1 518 739 A | 7/1978 |
| GB | 2105064 A * | 3/1983 |
| GB | 2 302 360 A | 1/1997 |
| WO | WO 89/06595 | 7/1989 |
| WO | WO 99/36243 | 7/1999 |
| WO | WO 99/48746 | 9/1999 |
| WO | WO 00/10802 | 3/2000 |
| WO | WO 00/27920 | 5/2000 |
| WO | WO 00/38863 | 7/2000 |
| WO | WO 00/46461 | 8/2000 |
| WO | WO 02/055923 A2 | 7/2002 |
| WO | WO2004/067304 | 8/2004 |
| WO | WO 2004/078451 | 9/2004 |
| WO | WO2005/080524 | 9/2005 |
| WO | WO2005/105441 | 11/2005 |

OTHER PUBLICATIONS

Copending U.S. Appl. No. 09/858,939, filed May 16, 2001.
Copending U.S. Appl. No. 09/459,756, filed Dec. 10, 1999.
Copending U.S. Appl. No. 09/676,725, filed Sep. 29, 2000.
Copending U.S. Appl. No. 09/923,138, filed Aug. 6, 2001.
Copending U.S. Appl. No. 09/631,211, filed Aug. 3, 2000.
Copending U.S. Appl. No. 10/216,944, filed Aug. 12, 2002.
Copending U.S. Appl. No. 60/413,493, filed Sep. 25, 2002.
Copending U.S. Appl. No. 10/217,991, filed Aug. 13, 2002.
Copending U.S. Appl. No. 60/415,511, filed Oct. 2, 2002.
Copending U.S. Appl. No. 60/399,742, filed Jul. 30, 2002.
Mansour et al., Optimal Bonding Thickness for Vehicle Stiffness.
European Search Report dated Aug. 31, 2004. Application No. EP 03 07 5228 (1001.073EP).

* cited by examiner

US 7,467,452 B2

METHOD FOR APPLYING FLOWABLE MATERIALS

This application is a continuation of application Ser. No. 10/342,025 filed on Jan. 14, 2003, now U.S. Pat. No. 7,043,815 which is a non-provisional of application No. 60/351,967 filed on Jan. 25, 2002.

CLAIM OF BENEFIT OF FILING DATE

The present application claims the benefit of the filing date of U.S. Provisional Patent Application Ser. No. 60/351,967 (filed Jan. 25, 2002), hereby incorporated by reference.

TECHNICAL FIELD

The present invention generally relates to methods and apparatuses for applying flowable materials to articles of manufacture. More particularly, the present invention relates to methods and apparatuses for applying melt flowable materials such as adhesive materials, sealant materials, expandable materials, weldable materials, structural materials, paintable materials or the like to components of automotive vehicles.

BACKGROUND OF THE INVENTION

Sealants, adhesives and other flowable or moldable materials are often used on various components of a variety of articles of manufacture. Such flowable materials, for example, are applied to several components of an automotive vehicle for purposes such as increasing the structural integrity of the vehicle, sealing, attaching components of the vehicle together, or improving vehicle noise, vibration or harshness (NVH) characteristics.

Application of the flowable materials to the various components can create a variety of challenges. There may be challenges presented in forming flowable materials with desired properties. For instance, the flowable materials may need to be formed with chemical properties, physical properties or both, which are compatible with the components to which the flowable materials are applied thereby allowing the flowable materials to adhere or otherwise interact with the components. There may be further challenges presented in designing and manufacturing effective apparatuses for applying the flowable materials to different components. For instance, challenges may be presented for forming apparatuses that can properly control the rates of creation and the rates of output of the flowable materials. There may be still further challenges presented by the various design aspects of the components to which the flowable materials are applied. For instance, the geometry of the components, the processing of the components and other similar design aspects can present a myriad of challenges to application of the flowable materials.

A number of methods found in the prior art relate to so-called "pumpable" products that are fluidic materials applied to selected portions of a vehicle during the assembly process. Although these methods may be highly advantageous in some circumstances and applications, the use of pumpable materials and equipment often tend to create additional maintenance and clean-up requirements in the manufacturing facility as well as increased labor demand. Certain aspects of the present invention serve to eliminate the need for pumpable products and methods by providing a method, process, and apparatus for the extrusion-in-place or dispensing of flowable materials directly to a selected surface or location through improved extrusion techniques, which can be employed for applying a variety of thermoplastic and thermosettable materials.

Accordingly, the methods and apparatuses disclosed in the present invention overcome the drawbacks and disadvantages of the prior art by economically and effectively extruding or otherwise dispensing flowable materials to components of articles of manufacture.

SUMMARY OF THE INVENTION

The present invention broadly involves methods and apparatuses for applying flowable materials onto components of articles of manufacture. In particular preferred embodiments, the invention involves precisely extruding a highly viscous flowable material onto one or more predetermined locations of one or more components of an automotive vehicle.

The flowable materials being applied according to the present invention may be adhesive materials, sealant materials, expandable materials, structural materials, weldable materials, weld-through materials, paintable materials or other suitable flowable materials. In one highly preferred embodiment, the flowable materials may be treated or otherwise processed for the application of additional materials which facilitate and allow the formation of a class A painted surface finish, or other class of painted or treated surface, upon the flowable material. In other embodiments, the flowable materials may be electrically conductive, insulative, magnetic, transparent or possess another advantageous property along some or all of its length.

Preferably, the flowable materials are applied as one or more blends in a first physical state (e.g., unfoamed, having a particular sectional profile, uncured, or otherwise) and are thereafter exposed to a stimulus such as heat, a chemical or another suitable stimulus to induce or activate the flowable materials to transform (reversibly or irreversibly) to a second physical state (e.g., foamed, to a different sectional profile, cured or otherwise). Moreover, the flowable materials may intrinsically exhibit various desirable properties such as sound absorption, vibration absorption, corrosion resistance, adhesivity, sealing properties, strength, stiffness and the like which may enhance respective properties of components that receive the materials. Alternatively, the flowable materials when applied, produce a combination with the underlying component that is enhanced in one ore more relevant property.

The present invention is further characterized by the use of equipment and methods, such as improved extrusion methods, designs, and equipment, which apply material directly onto the receiving part to form an assembly that can be further handled and incorporated in the assembly process. It is contemplated that the materials to be utilized in the present invention will generally be flowable materials, such as thermoplastic or thermosettable materials, typically encountered in manufacturing operations, such as the manufacturing of automotive, aerospace, marine and other vehicles as well as appliances, motor driven devices, and articles of furniture.

One preferred apparatus of the present invention typically includes an applicator for reproducibly dispensing the flowable materials onto a surface. In one embodiment, the apparatus includes an extruder for dispensing the flowable material through a die. In other embodiments, the apparatus may include mechanisms for moving components relative to an applicator (e.g., a die) of the apparatus, mechanisms for moving the applicator relative to the components or a combination thereof. For example, the extrusion apparatus and mechanisms of the present invention may utilize at least one roller bearing capable of double action movement to push and roll the chosen material. More particularly, the present invention may include extrusion devices having at least one drive screw which interacts and responds to reaction force to attenuate consistency, set back, ramping, and control of response time. In this regard, the present invention may utilize a servo driven position controlled system to drive the screw of the extruder and control its operations and response time, which can be as low as about 0.1 second. In this aspect of the present invention, the servo driven position controlled system may further comprise a servo loop, which receives feedback from an encoder, a servo valve, which provides the position control, and computer software to facilitate communication of the servo system and direct the system to function to the preselected response time. In still other embodiments, the present invention may incorporate an apparatus for the precision control system for the dispensing and application of flowable materials.

Among the methods of the present invention are methods for forming the flowable materials, methods for applying the flowable materials, methods for treating the surfaces of the components to which the flowable materials are applied, and combinations of such methods.

The components that receive a flowable materials preferably provide a surface suitable for receipt of the flowable material. In one embodiment, the surface of a component is configured to include a structure for increasing surface area for receiving the flowable materials, such as a channel, a rib, or otherwise. In another embodiment, the surfaces of the components may be treated (e.g., pretreated, post-treated or otherwise) to enhance adhesion of the flowable materials to its application surface. According to another aspect of the invention, flowable materials are applied to components that were previously unsuitable for receiving the flowable materials because of the nature or properties of the flowable materials, the components or both.

BRIEF DESCRIPTION OF THE DRAWINGS

These, and further aspects or embodiments of the invention will be made clear or will be become apparent during the course of the following description of a preferred embodiment of the present invention. In the drawings, which form an integral part of the specification and are to be read in conjunction therewith, and in which like reference numerals are employed to designate identical parts in the various views.

DETAILED DESCRIPTION OF A PREFERRED EMBODIMENT

Figure 1:
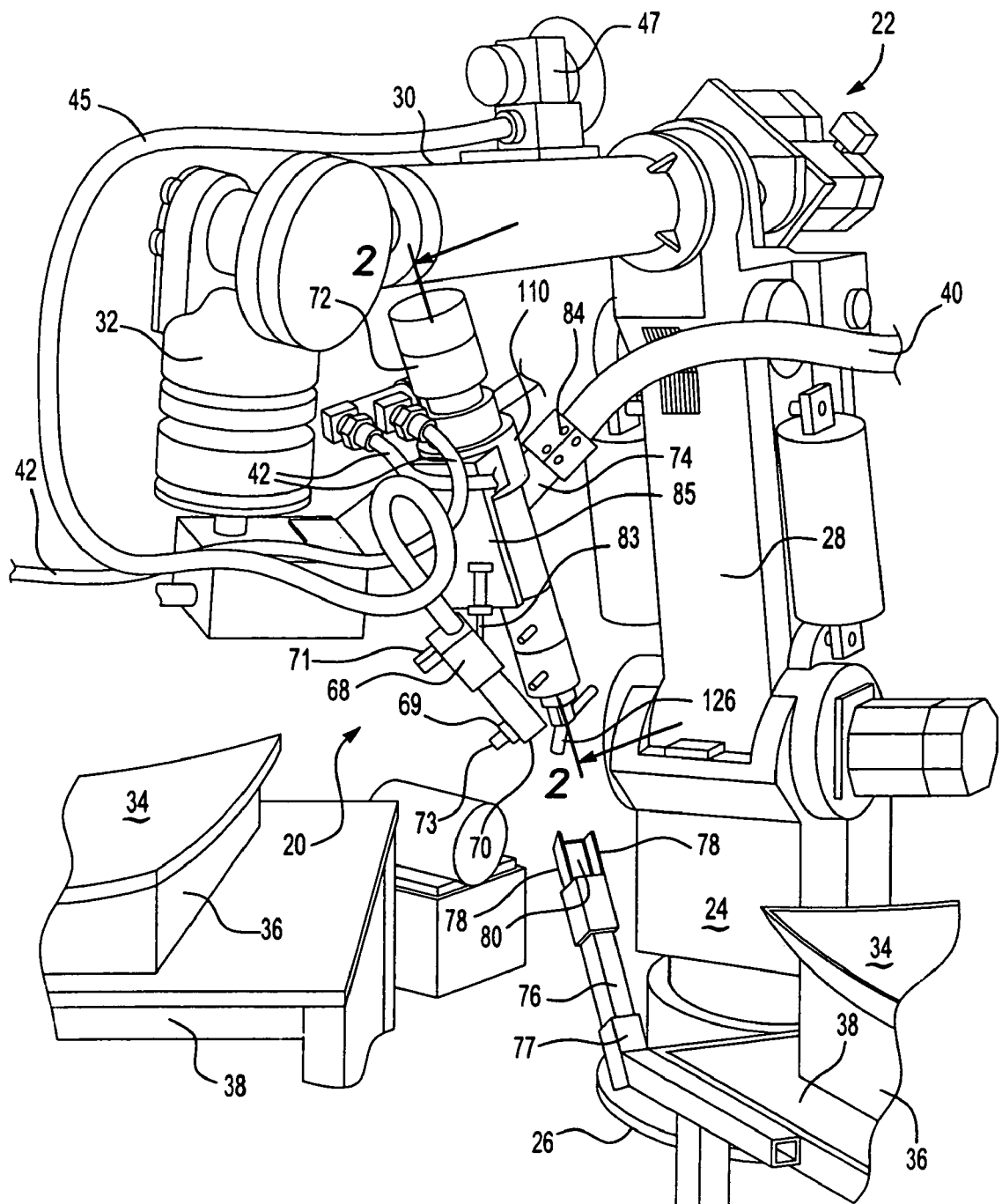
FIG. 1 is a perspective view of an apparatus having an illustrative portable extruder shown mounted on the end of a robotic arm, depicting use of the apparatus to apply extruded materials to parts on an off-line basis according to one aspect of the present invention.

The present invention involves applying flowable material to various components of articles of manufacture such as automotive vehicles. The description of this invention first discusses the potential flowable materials that can be applied according to the methods and using the apparatuses of the invention. Thereafter, the methods and apparatuses that may be used for applying the flowable materials are discussed. Lastly, the components of the articles of manufacture that receive the flowable materials and the manner in which the flowable materials are applied are discussed.

Flowable Materials

The flowable materials of the present invention can be chosen from a variety of different materials. In certain cases, the flowable materials may be conventional, but may be applied according to novel methods or using novel apparatuses or both. In other cases, the flowable materials may be conventional or known, however, the component to which the flowable materials are applied may be novel. In still other embodiments, the flowable materials themselves may be novel. The discussion below is meant to introduce the flowable materials generally according to their chemical makeup and in terms of properties exhibited by the flowable materials, for assisting a person of skill in art in choosing a material, which typically needs to be selected or tailored for a specific desired application.

According to one embodiment of the invention, the flowable materials may be heat activated. A preferred heat activated material is an expandable or other flowable polymeric formulation or composition, and preferably one that is activated to foam, flow or otherwise change states when exposed to the heating operation of a typical automotive painting operation such as during a primer or paint drying step. A particularly preferred material is an active polymer formulated in pellet form with each pellet typically 1-20 mm in diameter and generally, but not necessarily, configured in a geometric or polygonal shape, such as a sphere, to facilitate the flow of such pellets through an applicator such as an extruder. One preferred material is formed of an olefinic polymer-based foam, and more particularly an ethylene based polymer. For example, without limitation, the polymeric foam may be based on ethylene copolymers or terpolymers that may possess an alpha-olefin. As a copolymer or terpolymer, the polymer is composed of two or three different monomers, i.e., small molecules with high chemical reactivity that are capable of linking up with similar molecules. Examples of particularly preferred polymers include ethylene vinyl acetate, EPDM, or a mixture thereof. Without limitation, other examples of preferred foam formulation that are commercially available include polymer-based material commercially available from L&L Products, Inc. of Romeo, Mich., under the designations as L-2105, L-2100, L-7005 or L-2018, L-7100, L-7101, L-7102, L-7700, L-2410, L-2411, L-2412, L-4201, L-4141, etc. and may comprise either open or closed cell polymeric base material. Such materials may exhibit properties including sound absorption, vibration absorption, sealing ability, corrosion resistance and the like.

The material may also be a heat-activated epoxy-based resin having foamable characteristics upon activation through the use of heat typically encountered in an e-coat or other automotive paint oven operation. As the expandable material is heated, it expands, cross-links, and structurally bonds to adjacent surfaces. An example of a preferred formulation is an epoxy-based material that may include polymer modificis such as an ethylene copolymer or terpolymer that is commercially available from L&L Products, Inc. of Romeo, Mich., under the designations that include L-5204, L-5206, L-5207, L-5208, L-5222 or combinations thereof. Such materials may exhibit properties including relatively high strength and stiffness, promote adhesion, rigidity, and impart other valuable physical and chemical characteristics and properties.

When acoustical damping properties are desired, it is contemplated that the present invention may utilize a foamable material formulated to assist in the reduction of vibration and noise after activation. In this regard, reinforced and vibrationally damped components can have increased stiffness which will reduce natural frequencies, that resonate through the automotive chassis thereby reducing transmission, blocking or absorbing noise through the use of the conjunctive acoustic product. By increasing the stiffness and rigidity of the components of a vehicle, the amplitude and frequency of the overall noise, vibration or both that occurs from the operation of the vehicle and is transmitted through the vehicle can be reduced.

In addition to the use of an acoustically damping material, the present invention could comprise the use of a combination of an acoustically damping material and a structurally reinforcing expandable material along different portions or zones of the member depending upon the requirements of the desired application. Use of acoustic expandable materials in conjunction with structural material may provide additional structural improvement but primarily would be incorporated to improve NVH characteristics.

A number of other suitable epoxy-based materials are known in the art and may also be used. One such foam preferably includes a polymeric base material, such as an ethylene-based polymer which, when compounded with appropriate ingredients (typically a blowing and curing agent), expands and cures in a reliable and predicable manner upon the application of heat or the occurrence of a particular ambient condition. From a chemical standpoint for a thermally activated material, the foam is usually initially processed as a flowable thermoplastic material before curing. It will cross-link upon curing, which makes the material resistant of further flow or change of final shape.

The flowable material can be formed of other materials (e.g., foams regarded in the art as structural foams) provided that the material selected is heat-activated or otherwise activated by an ambient condition (e.g. moisture, pressure, time or the like) and cures in a predictable and reliable manner under appropriate conditions for the selected application. One such material is the polymeric based resin disclosed in commonly owned, co-pending U.S. patent application Ser. No. 09/268,810 (filed Mar. 8, 1999), the teachings of which are incorporated herein by reference.

Some other possible materials include, but are not limited to, polyolefin materials, copolymers and terpolymers with at least one monomer type an alpha-olefin, phenol/formaldehyde materials, phenoxy materials, and polyurethane. See also, U.S. Pat. Nos. 5,266,133; 5,766,719; 5,755,486; 5,575,526; 5,932,680; and WO 00/27920 (PCT/US 99/24795) (all of which are expressly incorporated by reference). Examples of suitable melt flow materials include, without limitation, formulations found in a commonly owned co-pending applications for a Paintable Seal System filed Aug. 7, 2000, and a Paintable Material filed Aug. 24, 2001, both hereby incorporated by reference. Still other materials and methods are disclosed in co-pending U.S. application titled "Sound Absorption System for Automotive Vehicles", Ser. No. 09/631,211, filed Aug. 3, 2000.

In general, some desired characteristics of the resulting material include relatively low glass transition point, and good corrosion resistance properties. In this manner, the material does not generally interfere with the materials systems employed by automobile manufacturers. Moreover, it will withstand the processing conditions typically encountered in the manufacture of a vehicle, such as the e-coat priming, cleaning and degreasing and other coating processes, as well as the painting operations encountered in final vehicle assembly.

In this regard, in applications where a heat activated, thermally expanding material is employed, a consideration involved with the selection and formulation of the material is the temperature at which a material reaction or expansion, and possibly curing, will take place. For instance, in most applications, it is undesirable for the material to be reactive at room temperature or otherwise at the ambient temperature in a production line environment since, in one embodiment, the material is extruded onto the intrusion device by a supplier and then shipped to the vehicle manufacturer as an integrated product. More typically, the material becomes reactive at higher processing temperatures, such as those encountered in an automobile assembly plant, when the material is processed along with the vehicle components at elevated temperatures or at higher applied energy levels, e.g., during e-coat preparation steps and other paint cycles. While temperatures encountered in an automobile e-coat operation may be in the range of about 145° C. to about 210° C. (about 300° F. to 400° F.), primer, filler and paint shop applications are commonly about 100° C. (about 200° F.) or higher. The material is thus operative throughout these ranges. If needed, blowing agent activators can be incorporated into the composition to cause expansion at different temperatures outside the above ranges.

Generally, suitable expandable flowable materials have a range of volumetric expansion from approximately 0 to over 2000 percent. The level of expansion of the vibration reduction material 20 may be increased to as high as 1500 percent or more. In certain embodiments, the material may be hyperexpandable materials that expand more than 1500 percent and preferably over about 2000 percent. The material may be expandable to a degree (or otherwise situated on a surface) so that individual nodes remain separated from one another upon expansion, or they may contact one another (either leaving interstitial spaces or not).

In another embodiment, the material may be provided in an encapsulated or partially encapsulated form, which may comprise a pellet, which includes an expandable foamable material, encapsulated or partially encapsulated in an adhesive shell. An example of one such system is disclosed in commonly owned, co-pending U.S. application Ser. No. 09/524,298 ("Expandable Pre-Formed Plug"), hereby incorporated by reference.

Moreover, the flowable material may include a melt-flowable material such as that disclosed in U.S. Pat. No. 6,030,701 (expressly incorporated by reference).

The choice of the flowable material used will be dictated by performance requirements and economics of the specific application and requirements. Generally speaking, automotive vehicle and other applications may utilize technology and processes such as those disclosed in U.S. Pat. Nos. 4,922,596, 4,978,562, 5,124,186, and 5,884,960 and commonly owned, co-pending U.S. application Ser. No. 09/502,686 filed Feb. 11, 2000, Ser. No. 09/524,961 filed Mar. 14, 2000, Ser. No. 60/223,667 filed Aug. 7, 2000, No. 60/225,126 filed Aug. 14, 2000, Ser. No. 09/676,443 filed Sep. 29, 2000, Ser. No. 09/676,335 filed Sep. 29, 2000, Ser. No. 09/676,725 filed Sep. 29, 2000, and particularly, Ser. No. 09/459,756 filed Dec. 10, 1999, all of which are expressly incorporated by reference.

For application purposes, it is often desirable for the flowable materials of the present invention to be formulated such that the materials exhibit desired properties (e.g., tackiness or non-tackiness) at various different processing stages or temperature. Of course, it is contemplated that such properties or temperatures may be variable depending upon the application of the flowable materials.

As discussed particularly for automotive operations, it is generally desirable for flowable materials of the present invention to activate and flow at temperatures experienced during paint cycles. Prior to activation, however, it is often preferable for the flowable materials to be exhibit solid and substantially non-tacky characteristics at temperatures near room temperature (e.g., between about 5° C. and about 50° C.), while exhibiting characteristics of slight flow and tackiness without activation at mid-level temperatures (e.g., between about 50° C. and about 100° C.). Advantageously, these characteristics allow the materials to be stored, transported and maintained in pellet form without substantial adhesion between the pellets. At the same time, the materials can be heated to mid-level temperatures to allow the materials to adhere to a substrate during application of the materials as further discussed below.

For forming a flowable material that exhibits such desired characteristics, a base resin with a narrow molecular weight distribution is preferably included in the material. The molecular weight distribution is preferably such that 70% of the polymers in the base resin are within 10,000 atomic mass units (amu) of each other, more preferably 80 percent of the polymers in the base resin are with 5000 amu of each other and even more preferably 90 percent of the polymers are within 1000 amu of each other. Preferably, the base resin comprises about 50 to about 100 weight percent of the material or of the polymeric constituents of the material and more preferably about 60 to about 90 weight percent of the material or of the polymeric constituents of the material.

It is also contemplated that the flowable materials may be formulated with one or more components, which assist in adhering the materials to a substrate upon application thereto. Typically, such components are added to achieve desirable interaction between the flowable materials and contaminants (e.g., oil and lubricants), which may be present upon a surface of a substrate to which the flowable material may be applied.

In one embodiment, the flowable material includes one or more solubilizing agents, which assist the flowable material in solubilizing contaminants on a substrate surface. Examples of such solubilizing agents include hydrocarbons (e.g, hydrocarbon process oils), pthalate plasticizers, liquid polyolefins or the like. Preferably, when used, such solubilizing agents are between about 1 and about 30 weight percent of the flowable material, more preferably between about 5 and about 20 weight percent of the flowable material.

In another embodiment, the flowable material includes one or more incompatible or low compatibility components, which can displace contaminants upon application of the flowable material to a substrate thereby assisting in adhesion of the flowable material to the substrate. Preferably, such components have relatively low molecular weights (e.g., less than 1000 g/mole) such that the components tend to migrate out the resin system of the flowable material. Examples of such components include polybutenes, polybutadienes, various waxes or the like. Preferably, when used, such low compatibility components are about 0.1 and about 30 weight percent of the flowable material, more preferably between about 2 and about 15 weight percent of the flowable material.

In another embodiment, the flowable material includes one or more polar components, which can aid in adhesion of the flowable material to the substrate. Preferably, such components have relatively low melting points (e.g., between about 50° C. and about 100° C.). Examples of such components include oxidized or otherwise functionalized waxes, epoxy resins or combinations thereof. Preferably, when used, such polar components are about 1 and about 30 weight percent of the flowable material, more preferably between about 2 and about 15 weight percent of the flowable material.

In still another embodiment, the flowable material includes one or more components such as waxes that are modified with an adhesion promoter such as an acid anhydride group. Preferably, when used, such modified components are about 1 and about 30 weight percent of the flowable material, more preferably between about 5 and about 20 weight percent of the flowable material.

In yet another embodiment, the flowable material includes a two-component system wherein a first component interacts with a second component to increase tack of the flowable material during application. For example, pellets of a relatively lower molecular weight material may be combined with pellets of a compatible higher molecular weight base polymer, which, upon mixing and elevation to a mid-range temperature, increase tack due to the compatibility of the two types of pellets. As another example, a small amount of pellets of one material may be combined with pellets formed of a second material wherein the first material has reactive functionality that is activated upon mixing with the second material for promoting adhesion.

Apparatuses for Application of Flowable Materials

An apparatus for applying flowable materials to components according to the present invention may be provided in a variety of configurations. The apparatus typically includes at least one applicator having an outlet through which the flowable materials are passed. The applicator may comprise molding equipment such as compression or injection molding equipment, extrusion equipment or other applicator equipment. The apparatus preferably assists in forming the flowable materials into a desired configuration prior to applying the materials. Additionally, the apparatus may be capable of moving its applicator (e.g., via a single axis or multiple axis robot art) to assist the applicator in applying the flowable materials to one or more components.

Figure 2:
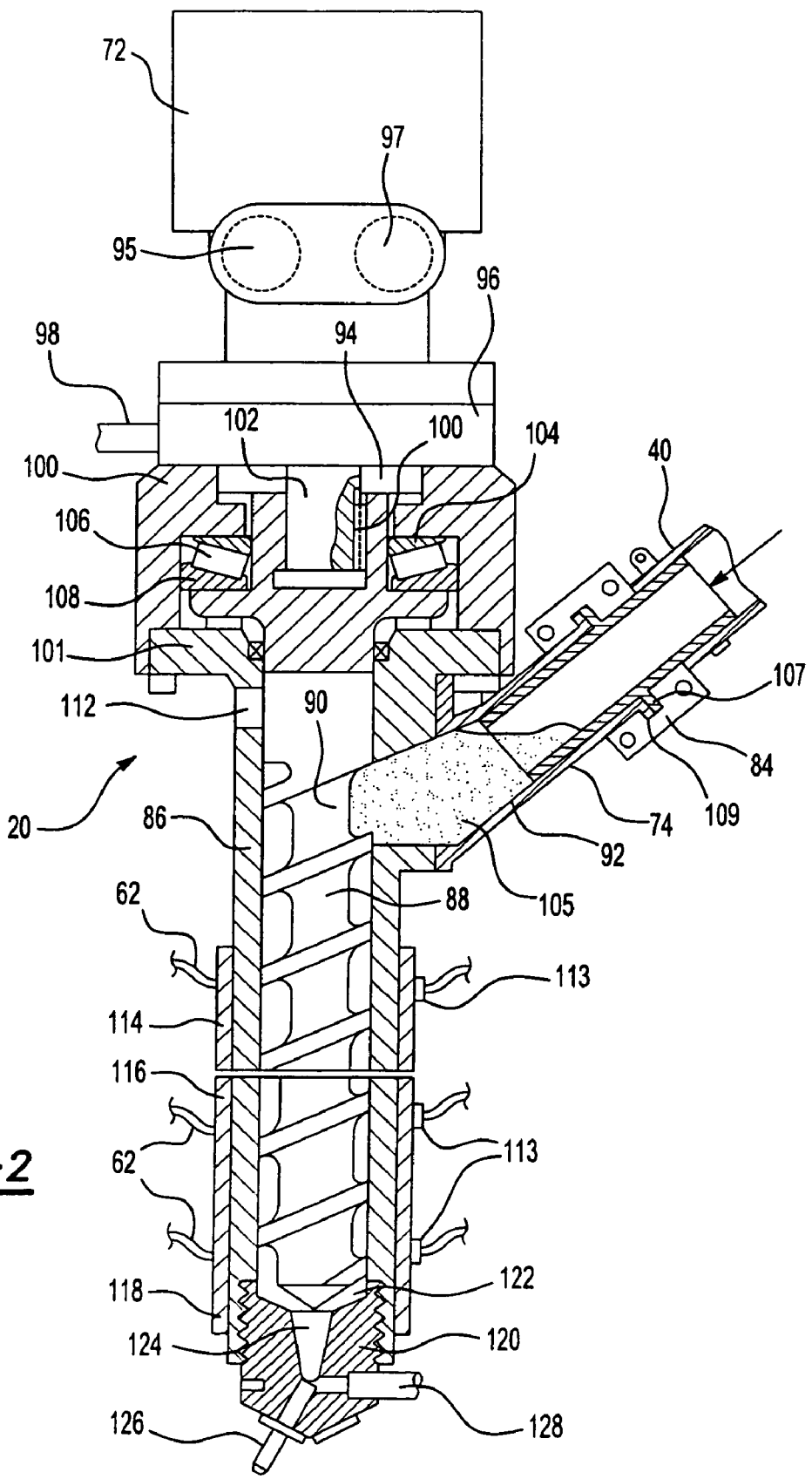
FIG. 2 is a sectional view of the portable extruder, taking along the line 2-2 in FIG. 1.
Figure 3:
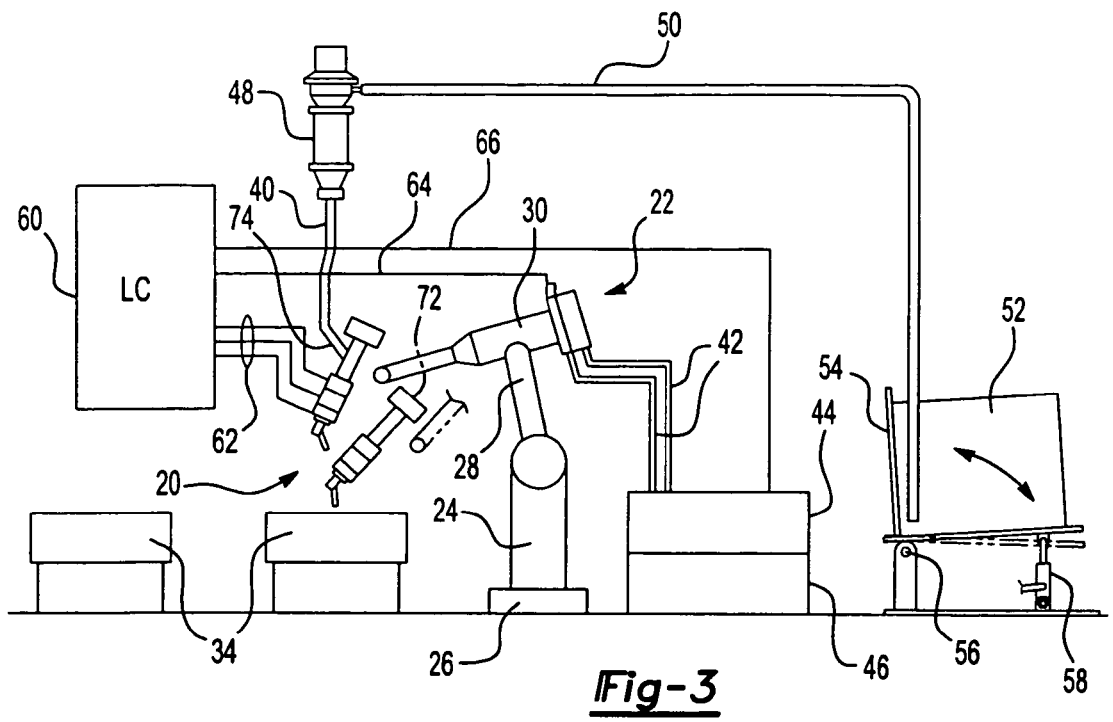
FIG. 3 is an operational diagrammatic view of the portable extruder shown in FIG. 1.

Referring first to FIGS. 1, 2 and 3, there is illustrated an exemplary embodiment of an apparatus for applying melt flowable materials. The apparatus generally includes a lightweight, portable material applicator generally indicated by the numeral 20. The applicator for the present invention may be an extruder, pressure applicator such as hydraulic, electric or pneumatic applicators or another suitable applicator.

In FIGS. 1 and 3 the applicator 20 is shown as an extruder mounted on a robot mechanism 22. The robot 22 includes a stationarily mounted base 26 upon which there is rotatably mounted a turret 24, along with three pivotally connected arms 28, 30 and 32. As illustrated without limitation, the applicator 20 is mounted on the end of the arm 32 and thus has freedom of movement about 6 axes. In alternative embodiments, the applicator 20 may be moveable by a mechanism other than the robot 22. For instance, the applicator 20 may be mounted on tracks that permit movement of the applicator in one or a plurality of axes. In still other alternative embodiment, the applicator 20 may be stationary.

In FIG. 1, the applicator 20 is operated on an off-line basis to apply extrusions at appropriate locations on parts that may be stationary or moving, such as to the illustrated roof panels 34 which are mounted on jigs 36 supported on individual tables 38. The extruder 20 is powered by a suitable motor 72 (such as a hydraulic motor), which is coupled with a drive mechanism, such as one including a pair of hydraulic lines 42 to a hydraulic pump 44 and related reservoir tank of hydraulic fluid 46.

The flowable materials may be supplied to the applicator according to various protocols. The flowable materials may be pumped to the applicator in a flowable state. They may be conveyed by a mechanical conveyor. They may be advanced by a screw. They my be advanced by a piston. Other approaches are also possible. Materials may be fed to the applicator as a solid and the applicator may process the materials (e.g., with heat, a solvent, a reactant or a combination thereof) to form flowable materials. Additionally, various ingredients may be fed to the applicator at various locations. For example, an extruder may have one or a plurality of inlets for receiving various ingredients that are introduced and mixed within the extruder.

The material may be supplied from nearly any suitable container such as a bin or other container, and the material may be supplied in many forms such as pellets, granules, particles or the like. Examples of suitable pellet shapes include cylinders, polyhedron, egg-shaped, oblong trapezoids, rings, cubes, spheres, hemispheres, polyhedrons, prisms, pyramids or other geometric or irregular shapes.

The form in which the material is supplied will typically depend upon the nature of the material being supplied. Generally, it is preferable that the pellets include very few, if any, sharp edges. As used herein edges of the pellets are typically defined by adjoining surfaces of the pellets and the sharpness of those edges is typically defined by the angle at which the surfaces are disposed relative to each other (i.e., the sharper the edge, the smaller or more acute the angle). In a preferred embodiment, the surfaces forming edges on the pellets are disposed at greater than about 70°, more preferably greater than about 90° and even more preferably greater than about 110°. In a highly preferred embodiment, the pellets are substantially free of edges, and include only curved surfaces, flat surfaces or both.

As an example, without limitation FIG. 1 shows a supply bin 52 mounted upon a table 54 which tilts about a pivot point 56 in response to elevation by a pneumatic cylinder 58. A vacuum pump 48 draws the solid pellets of material from the supply bin 52 through a draw tube 50 to a point elevated above the applicator 20. The pellets are then gravity fed through the feed tube 40 into an inlet tube 74 (FIG. 2) of the applicator 20.

In connection with extruding many forms of adhesives and sealers, particularly expandable adhesives, it is important to help keep processing temperatures below the activation temperature of the material. One way to do this is to control shear, so that the application of pressure to the material will not result in heating the material. The use of a precisely controlled motor (such as an hydraulic motor) to drive the extruder helps allow precise control over the compression characteristics of the extruder. A hydraulic motor 72, for instance, provides a large amount of torque and possesses a fast response curve, thus allowing the extrusion to be started and stopped very quickly. This control characteristic is advantageous especially in connection with extruding flowable materials in applications having strict tolerance limits.

One preferred apparatus for applying the flowable materials is at least partially automatically controlled, although a combination of manual and automatic control is contemplated and in some circumstances may be desirable. Preferably, a control system sends computerized commands telling the applicator when to supply the flowable material to the components such that the material is properly applied to appropriate predetermined surfaces of the components. In the preferred embodiment shown in FIG. 3, virtually all functions of the extruder 20 and associated robot 22 can be controlled by a PLC 60 (programmable logic controller), although other computerized systems and computer software driven systems can be used in the present invention. Electrical control signals are delivered from the PLC 60 via line 66 to the hydraulic pump 44, via one line 64 to various servo motors on the robot 22 and via other lines 62 to three separate heating elements 114, 116 and 118 surrounding the middle and lower reaches of a barrel (e.g., cylindrical barrel) 86 of the extruder 20.

Figure 15:
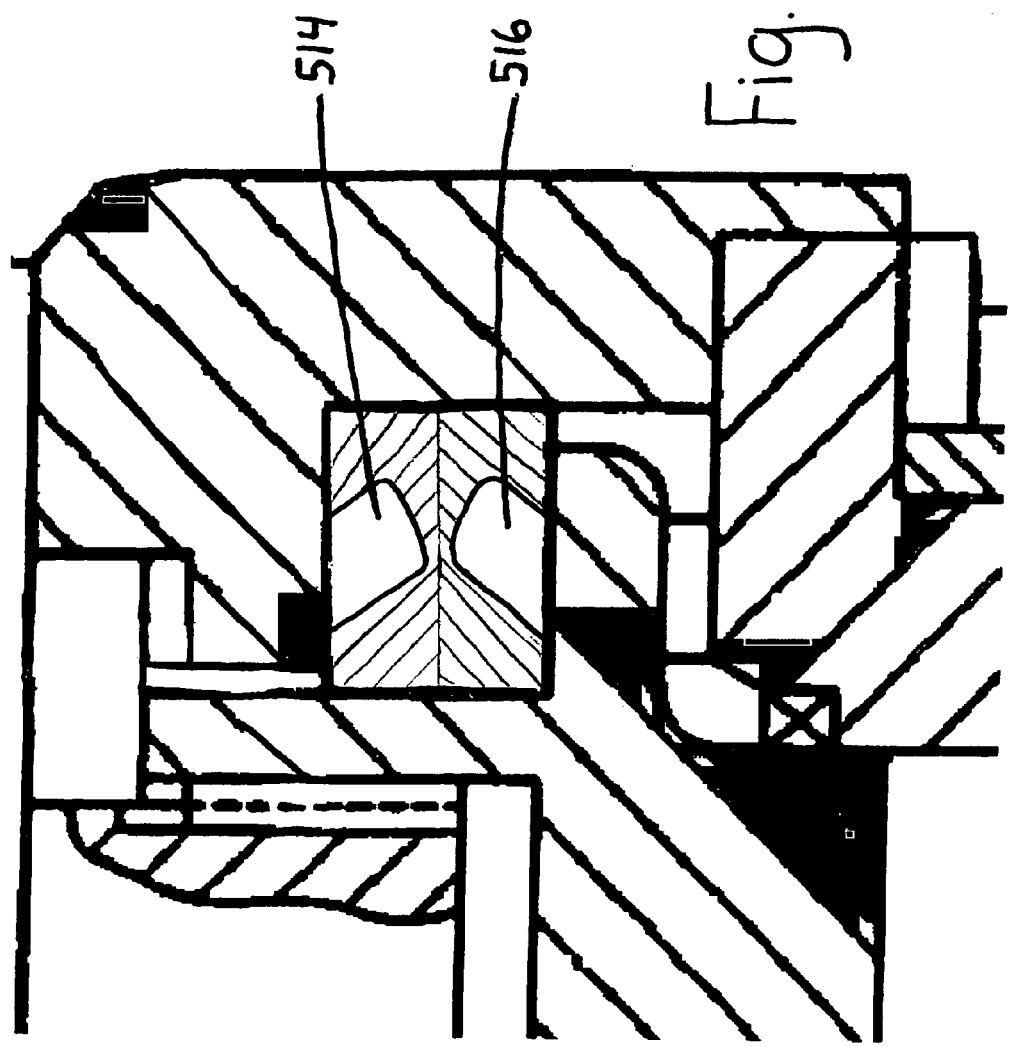
FIG. 15 is close-up of another sectional view of the portable extruder including two thrust bearings.

Since the extruder is required to modulate the extrusion rate (throughput), the screw is subjected to a highly variable torque and therefore is subject to variable reaction forces. A preferred screw bearing assembly therefore comprises at least two thrust bearings (or the like), 514, 516 FIG. 15, acting in opposite directions. It is contemplated that the present invention also incorporates a process for the use of repeatable and predictable amounts of materials so that the extruder essentially functions as a quasi volumetric pump which can tightly control the rotation angles of the screw. A closed-loop servo-control system can be used to achieve, control, and operate the position of the screw and may comprise an hydraulic system (which may further include a servo valve) or an electric servomotor. It is contemplated that the hydraulic system is desirable in applications where weight is a prime factor while for stationary systems, the electric system may be the prime choice.

It may be desirable to heat the surface of the components to receive the flowable material prior to applying flowable material to the surface. For example, some processes of the present invention include steps of heating the surfaces for cleaning (e.g., driving off a contaminant), for enhancing the adhesion, for thermally expanding the component or combination thereof. The surface may be heated by radiation, conduction, convection or combination thereof, using a heater such as an oven or furnace into which the components are inserted and removed, or are passed through, by a bath, by a light source (e.g., a laser, a lamp, or otherwise), a flame, an inductor or some other suitable heater. The heater may be provided as part of the apparatus for applying the flowable materials or separately, both of which are discussed below.

In the particular embodiment shown, an optional air blower 47 is mounted on the arm 30 of robot 20 delivers air through line 45 to an electrically heated manifold 68 to which there is attached an outlet air nozzle 70. The manifold 68 and a temperature sensor 69 on the end of nozzle 70 are connected to the PLC 60 via lines 71 and 73, respectively. The manifold 68 is pivotably mounted on a rod 83 which is longitudinally adjustable within a threaded mounting flange 85 which is secured to a hub 110 forming part of the extruder 20. By this manner of mounting, the end of the nozzle 70 may be adjusted so as to direct warm air at a desired temperature onto the substrate in close proximity to the point where an extruded bead of material exits an extrusion die 126 and is deposited onto the components.

For the hydraulic motor 72 shown in FIG. 2 a pair of threaded fluid ports 95, 97, are adapted to be coupled with the hydraulic lines 42. The hydraulic motor 72 is mounted through a spacer 96 and adapter ring 94 to a cylindrical hub 110. The adapter ring 94 surrounds the output shaft 102 and is received within a cylindrical depreciation within the hub 110. A rotatable output shaft 102 of the motor 72 extends through the hub 96 and into an opening in the hub 110 where it is secured via a key 100 to the upper reaches of feed screw 88. A sensor 98, such as a tach sensor, is mounted on the spacer 96 to sense the rotation of the shaft 102, including the rotational speed of the shaft 102. The upper end of the feed screw 88 is journaled for rotation within the hub by means of a thrust bearing comprising a pair of bearing races 104, 108 and roller bearings 106.

The upper end of the cylindrical barrel 86 includes a cylindrical flange 101 secured by bolts to a circumferentially extending shoulder of the hub 110. A lateral opening 112 in the sidewall of barrel 86 provides pressure relief. An inlet opening 90 in the barrel 86 allows the introduction of solid material pellets 105 into the interior of the barrel 86, at the upper end of the feed screw 88. The inlet feed tube 74 forms a slight dog leg feed path into the opening 90 which may, depending upon the nature of the pellets 105 and the attitude of the extruder 20, become jammed somewhat, from time to time, thereby potentially interrupting constant flow to the feed screw 88. To eliminate this problem, a swivel feed tube connection has been provided for coupling the feed tube 40 to the inlet tube 74. This connection comprises an inner, tubular sleeve 92 which extends down into the inlet tube 74 and is secured to the feed tube 40. The inner sleeve 92 includes a circumferential flange 107 which rotatably bears upon a mating flange 109 on the upper end of inlet tube 74. Flanges 107 and 109 are received within a groove in a collar 84 which is secured to sleeve 92 and has a portion surrounding inlet tube 74. From the description of the foregoing inner connection, it may thus be appreciated that the inner sleeve 92, collar 84 and feed tube 40 rotate independently of the inlet tube 74. By this arrangement, in the event that the pellets 105 of material jam near the bottom of the inlet tube 74, the rotational movement of the feed tube 40, and thus the inner sleeve 92 tends to dislodge the pellets so that they flow freely into the inlet opening 90 so as to smoothly feed into the screw 88. In alternative embodiments, a gas such as air may be blown into the feed tube at regular intervals to assist the flow and dispensation of the pellets and otherwise avoid jams of the pellets. Also, it may be appreciated that the extruder may be moved and manipulated during the extrusion process through many degrees of motion without stressing or otherwise interfering with proper flow of pellets through the feed tube 40, since the feed tube 40 rotates freely upon the extruder 20.

It may be desirable to raise, lower or maintain the temperature of the flowable materials such that the materials flow properly into, through and out of the applicator. More often than not, it is desirable to raise the temperature of the flowable materials particularly when the materials are brought to a flowable state by heating. The flowable materials may be heated before entering the applicator, while in the applicator or after leaving the applicator. Various heating mechanisms may be used to heat the flowable material prior to, during, or after the materials are within the applicator. Examples of heating elements include wire wound rubber heaters, mounted heater subassemblies, coil wire heating elements, flexible heating elements, or the like.

As indicated earlier, in the preferred embodiment, the medial and lower reaches of the barrel 86 have mounted therearound band shaped heating elements 114 which are controlled by the PLC 60. The heating bands 114, 116 and 118 surround the barrel 86 and are provided with temperature sensors 113 to provide temperature feed back information to a display (not shown) and the PLC 60. The lower heating band 118 can be seen to reach virtually to the end of the barrel 86, adjacent the extrusion nozzle 120. The heating bands 114-118 function to melt the pellets 105 into a flowable material which is fed by the screw action of feed screw 88 to an accumulating chamber 122 and thence through a tapered feed passage 124 within nozzle 120 to an extrusion die 126. Extrusion die 126 possesses an extrusion opening therein which has a cross-section conforming to the desired shape of the extruded bead. The extrusion die 126 is threadably received within in the nozzle 120 which in turn is threadably received within a lower threaded opening in barrel 86, concentric with the central axis of feed screw 88. A pressure sensor 128 secured within nozzle 120 delivers signals to the PLC 60 relating to the pressure of the flowable material as it enters the die 126.

In a preferred embodiment, the PLC operates the extruder using closed loop control on the rotation of the screw of the extruder. (i.e., the sensor tells the PLC how fast the extrudate is being emitted and the screw of the extruder may be rotated slower or faster to realize a proper rate). In this manner, control over the rate of emission of the extrudate can be precisely controlled and the extruder can get to the desired speed of emission in a very short period of time (e.g., less than a second).

In a highly preferred embodiment, the applicator uses closed loop control based upon a metering system. In such a system, the output of flowable material from the extruder is experimentally related to the positioning angle of the extruder and the rotational speed of the extruder screw. With reasonable amounts of experimentation the amounts of volumetric flowable material output for different rotational speeds of the extruder screw can be known to a reasonably high degree of certainty thereby permitting proper volumetric output of flowable material as long as the rotational speed of the extruder screw is commesurate with such output. Thereafter, a desired profile may be input to the PLC for a chosen component. Preferably, the profile relates the desired amount of flowable material output over time, the desired positing angle of the extruder, or both to the desired rotational speed of the extruder screw for a chosen component. As the flowable material is output, data regarding the angle of the extruder and the rotational speed of the extruder screw are monitored via sensors such as the sensor 98 or other devices and the data can be sent to the PLC. In turn, the PLC commands the motor to either raise, lower or maintain the amount of torque that the motor is applying to the extruder screw such that the output of flowable material or the rotational speed of the extruder screw closely mirror the desired profile. In this manner, the extruder is used as a metering device. Since the output of flowable material is very closely related to and predictable based upon screw rotational speed.

Depending upon the flowable material that is being applied, it may be desirable to remove excess or stray material from the applicator between each application or intermittently between applications to avoid interference with flowable material output.

In exemplary embodiments, excess material may be removed from the applicator by directing a gas such as air at the outlet of the applicator. Alternatively, excess material may be removed manually by wiping the outlet with a cloth or other wiping material. Grinding or polishing steps may also be employed. As shown in FIG. 1, a wiper may be provided comprising a wiping wire 80 held between the ends of two arms 78 which are mounted on the end of a rod 76. Preferably, the rod 76 is slidably adjustable within a holder 77 mounted on the table 38. In order to wipe excess material from the end of the nozzle 126, the robot 22 moves the extruder 20 such that the outer end of the die 126 passes across the wire 80 which cuts off the excess material.

Alternatively or additionally, the applicator 20 may be programmed to pull the flowable material within the applicator 20 after each application such that excess material is removed. In the embodiment wherein the applicator is an extruder, the PLC may be programmed to reverse the turning direction of the extruder screw such that the flowable material is drawn back into the extruder 20 for a short period of time or for a short distance after each application thereby minimizing the excess material on the end of the die 126 after each application.

Figure 8:
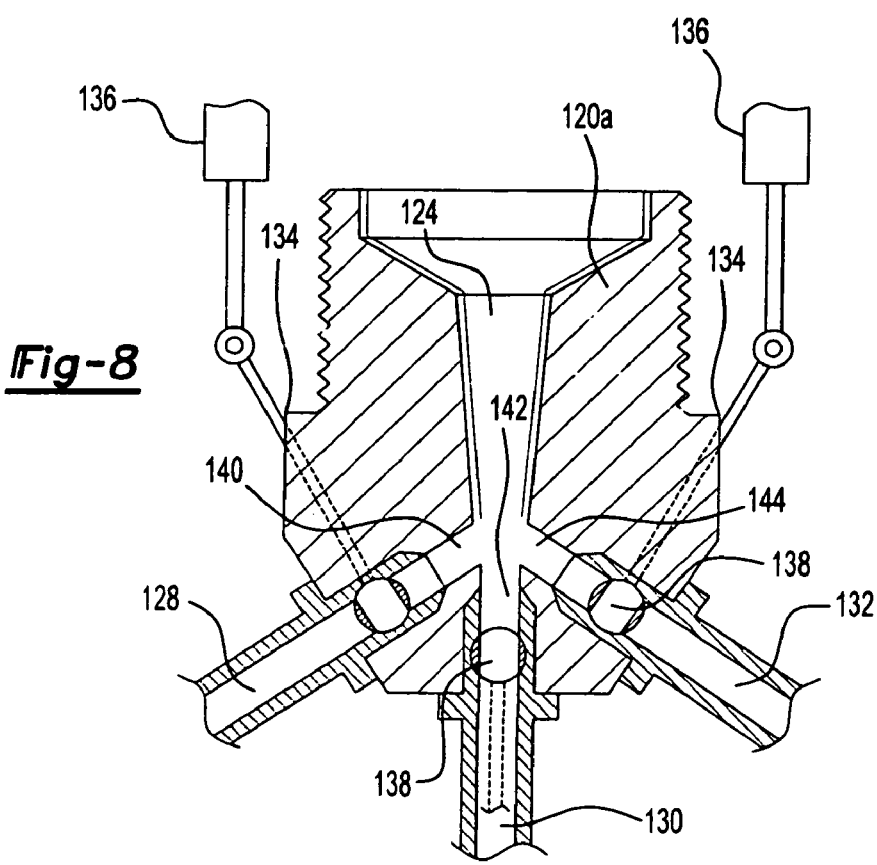
FIG. 8 is a fragmentary, cross-sectional view of an alternate form of a nozzle for use with the extruder of FIG. 1.

Attention is now directed to FIG. 8 which depicts, on a larger scale, an alternate form of nozzle arrangement for the extruder 20, in which a plurality of extrusion dies 128, 130 and 132 are provided. The multiple dies 128-132 may be positioned in the nozzle body 120*a* at any desired position or angle, relative to each other, and may possess die openings which differ in their characteristics (size, cross-sectional configuration, etc.). This permits on-line extrusion of differently configured beads without the need for changing dies or using multiple extruders. The bottom end of the feed passageway 124 delivers flowable material to the dies 128-132 via distribution channels 140, 142 and 144. In the embodiment shown, flow of the material is selectively controlled to the multiple dies 128-132 by means of valving, herein illustrated as ball valves 138 which are operated by linkage rods 138 operated by any suitable form of motors or drive mechanisms such as pneumatic cylinders 136.

In alternative embodiments, various fastening mechanisms may be used to attach dies such as extrusion dies 128, 130 and 132 to an applicator such as the extruder 20. For example, it is contemplated that the fastening mechanisms may include quick connect or quick change attachment devices such as quick connect nut and bolt fastener, hydraulic quick connect fasteners, male/female quick connect fasteners or the like.

In other alternative embodiments, the apparatus for applying flowable materials may be configured for coextruding a plurality of materials (e.g., plastic combinations, metal and plastic combinations, or otherwise). For example, more than one die may be secured to a single applicator or a single die may have more than one opening for emitting separate beads of materials.

For certain embodiments of the present invention, it may be desirable for flowable material to be applied to a substrate or component at one location, followed by transporting the component or substrate to a second location for assembly to an article of manufacture. For example, in the automotive industry, an automotive supplier may desire to apply a flowable material to a substrate or component at its own facility that is geographically remote from an assembly plant (e.g., an original equipment automotive vehicle assembly line). Thereafter, the component or substrate is typically shipped or otherwise transported to an automotive assembly plant where it is assembled to a vehicle preferably prior to painting of the vehicle. Alternatively, it may be desirable to apply flowable material to a component or substrate in the same location that the component or substrate is assembled to an article of manufacture.

Figure 4:
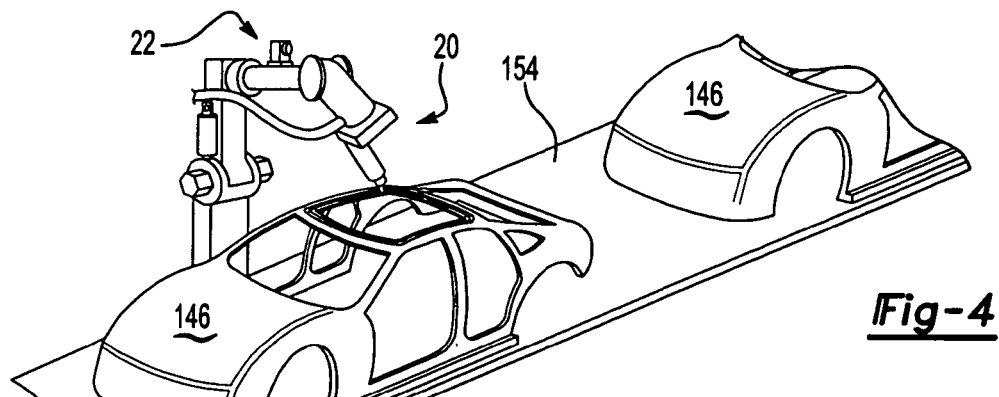
FIG. 4 is a view of the portable extruder of FIG. 1, but shown in relationship to an assembly line for manufacturing automobiles.
Figure 5:
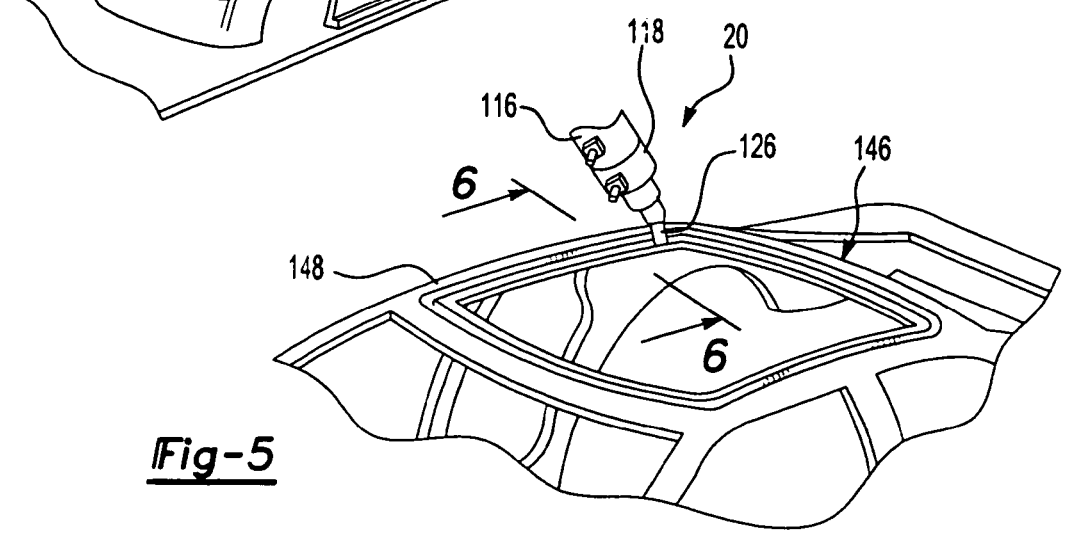
FIG. 5 is an enlarged, perspective view of a portion of a vehicle body and the extruder shown in FIG. 4.
Figure 6:
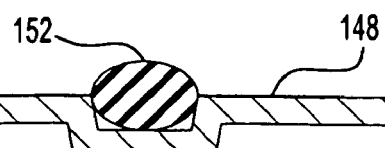
FIG. 6 is a cross-sectional view taken along the line 6-6 in FIG. 5.

Attention is now directed to FIGS. 4, 5 and 6, which depict the extruder 20 adapted for use in an in-line extrusion application for automated assembly of vehicles on a production line. Vehicle bodies 146 on a moving production line 154 pass by a sealant application station comprising the previously described extruder 20 mounted on the end of a robot 22. Under programmed control of the PLC 60 (FIG. 3) the extruder 20 automatically extrudes a bead 152 of material into a channel 150 formed in the roof surface 148 of each vehicle 146. By virtue of the precise control of material flow afforded by the use of the motor 72, and the exceptionally light weight of the extruder 20 owing to its construction which allows it to be placed on the end of a robotic arm, a precisely configured bead of sealant may be introduced at the proper location within the channel 150 around the entire periphery of the roof surface 148, while the vehicle 146 moves down the assembly line.

According to preferred embodiments, apparatuses according to the present invention may be configured to place flowable materials upon components of vehicles within very tight tolerances. In a preferred embodiment, flowable materials may be placed within at least one centimeter of their intended location, more preferably within three millimeters of their intended location and even more preferably within one millimeter of their intended location.

As previously stated, it can be important for the sealant bead 152 to exit from the extruder 20 at the proper temperature, with proper flow characteristics and with a desired cross-sectional configuration for the sealant bead 152 to properly perform its function. These material characteristics are particularly important in various applications, as for example where sealant material is used which later expands after curing or after application of heat, to fill voids (e.g., cavities, gaps, seams or the like). Such applications may be applied to automotive vehicles components such as bulkheads, instrument panels, wheel wells, floor pans, door beams, hem flanges, vehicle beltline applications, door sills, rockers, decklids, hoods, etc. Moreover these components may be formed of metal stampings, molded plastic, extruded plastic, machined or cast metal or the like.

Figure 7A:
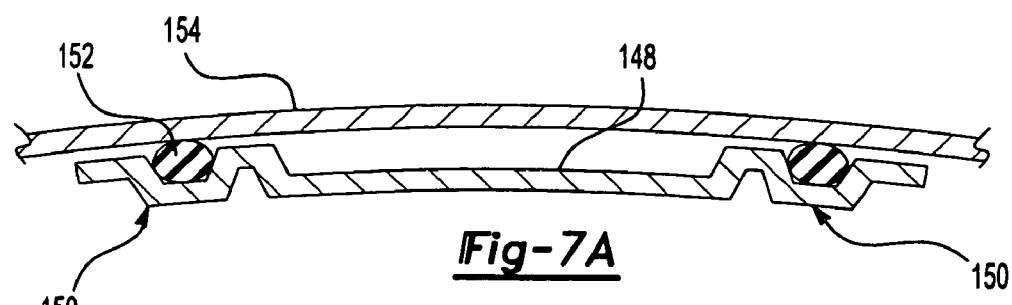
FIGS. 7a and 7b are views similar to FIG. 6 but showing a roof panel having been installed, and depicting the position of the extruded sealant bead respectively before and after expansion thereof.
Figure 7B:
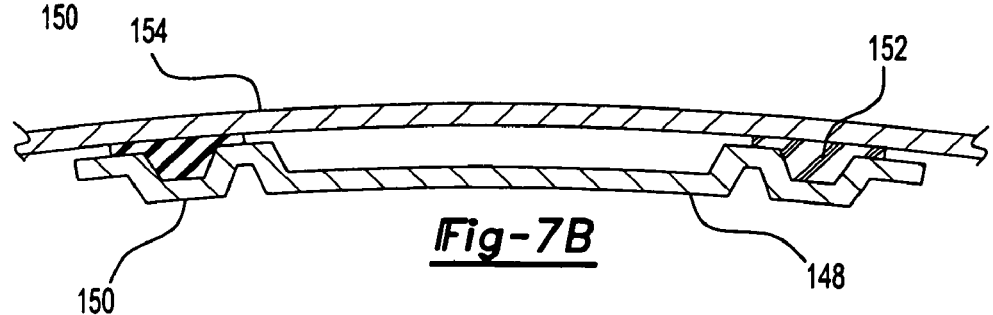

As an example, FIG. 7*a* depicts the roof surface 148 immediately after a roof panel 154 has been installed in overlying relationship on the vehicle 146; a slight gap forming a void is present between the roof panel 154 and roof surface 148. FIG. 7*b* shows the relationship of these components after the bead of sealant has been expanded through curing and/or the application of heat to fill the void between the body parts. The control overflow characteristics of the sealant material is achieved in a very precise manner, for several reasons. First, as stated before, the use of a hydraulic motor 72 results in the provision of a very high level of torque to the feed screw 88, yet the weight of the hydraulic motor 72 is not so great as to preclude mounting the extruder 20 on a robot arm. The sensor 98 precisely senses the rotation of the feed screw 88, and thus provides immediate feedback information which allows the PLC 60 to control the hydraulic motor 72 accordingly. Also, the heating bands 114-118, along with temperature sensors 113 envelop the sealant material to define separately controllable heating zones and control the final temperature quite precisely as the material exits the extrusion die 126. The exact flow rate of sealant material exiting the die 126 is further controlled as result of the provision of the pressure sensor 128 which provides feedback information to the PLC 60 relative to the pressure of the sealant material immediately before it is extruded, which in turn is directly related to flow rate or as a result of the sensor 98 monitoring rotational speed of the extruder screw, which can also be related to flow rate. The unique rotatable connection of the feed tube 40 to the extruder 20 also assures constant, controllable flow rate in that temporary interruption or diminution of material feed is eliminated. Finally, the provision of a flow of precisely directed hot air emanating from the heat nozzle 70 allows the substrate to be pre-heated, thereby better conditioning the extruded material to absorb oils and the like from the substrate.

Figure 9:
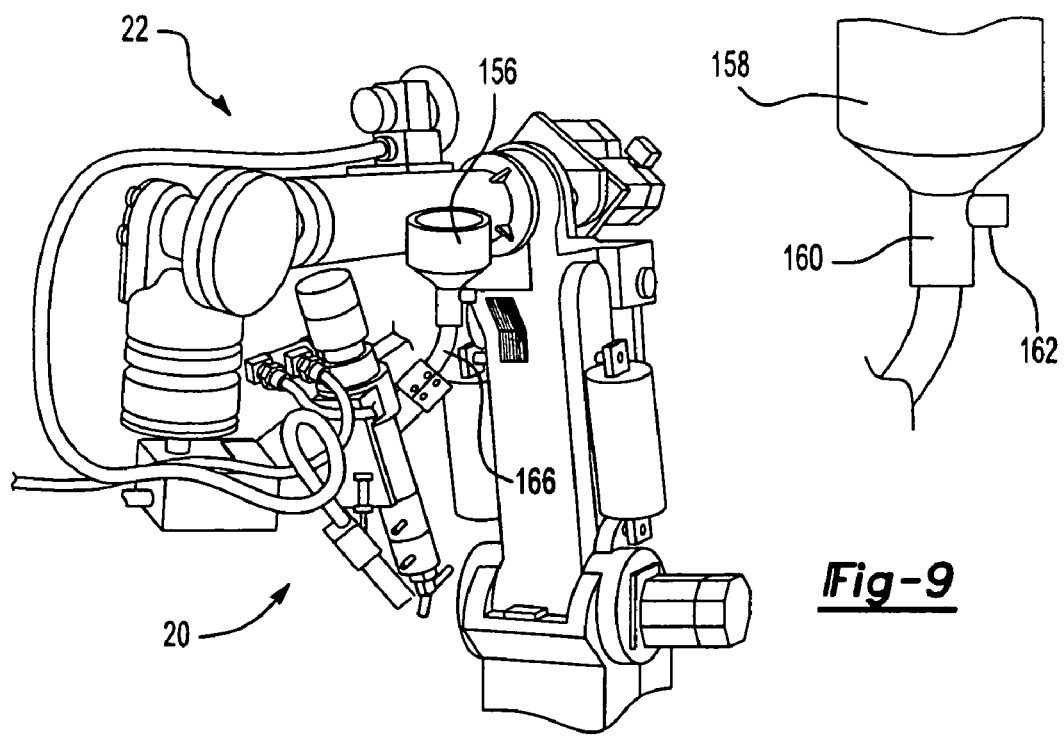
FIG. 9 is a perspective view of an extruder according to the present invention, depicting an alternate form of a material supply system.
Figure 10:
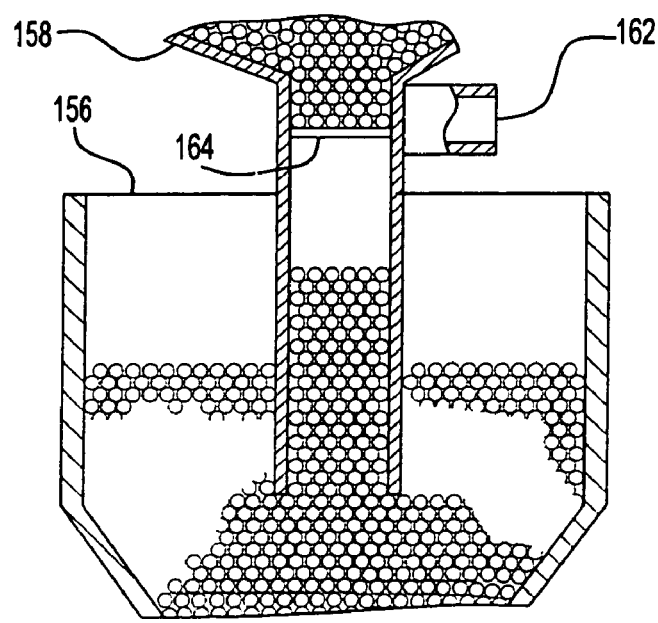
FIG. 10 is an enlarged, cross-sectional view of the batch hopper and supply feed tube of the system shown in FIG. 9, immediately after a batch has been dispensed.

For some applications, alternate forms for feeding solid pellets of a sealant material to the extruder 20 may be provided. For example, as shown in FIGS. 9 and 10, batch hopper 156 may be mounted on the extruder 20 to supply material pellets, rather than the flexible feed tube 40 discussed earlier. The batch hopper 156 gravity feeds pellets through an elbow tube 166 which is connected with the inlet tube 74. The size of the batch hopper 156 accommodates a single "batch" which is sufficient to apply sealant to a given part or for a specific job. In order to replenish the batch hopper 156, the robot 22 swings the extruder 20 to a loading position, in which the hopper 156 is positioned beneath a material dispenser 158, with a discharge tube 160 of the dispenser 168 extending down into the interior of the hopper 156, as best seen in FIG. 10. A motor member 162 which may be electrical, hydraulic or pneumatic, controls a discharge valve diagrammatically indicated by the numeral 164 in order to allow a single batch of material to be dispensed through the discharge tube 160 into the hopper 156. After a batch of material has been so discharged, the robot 22 lowers the extruder 20 into clearing relationship to the dispenser 158 and discharge tube 160. As the hopper 156 moves away in this manner, the remaining material within the discharge tube 160, beneath the valve 164, flows down and into the hopper 156. In other alternatives, the applicator may be continuously located below the supply of pellets (e.g., wherein the applicator is relatively stationary) such that the supply of beads or pellets can be continually replenished and the beads can continuously flow to the applicator under gravitational forces.

In preferred embodiments, dissimilar pellets may be fed to an extruder to form a flowable material as a blend of materials. According to a particularly preferred embodiment, one material may be introduced in pellet or other form into a first opening in the extruder and a second material may be introduced in pellet or other form into a second opening in the extruder. In this manner, a flowable material may be formed that includes layers of different materials that are "candy-striped" along the length of the flowable material when the material is applied to a component. Preferably, the openings through which the pellets of different material enter the applicator are generally opposite each other to form the layers of flowable material. In this manner, various materials such as more highly reactive material may be combined with other materials later in the process of forming the desired flowable material to prevent undesired or premature reaction between such materials.

Figure 11:
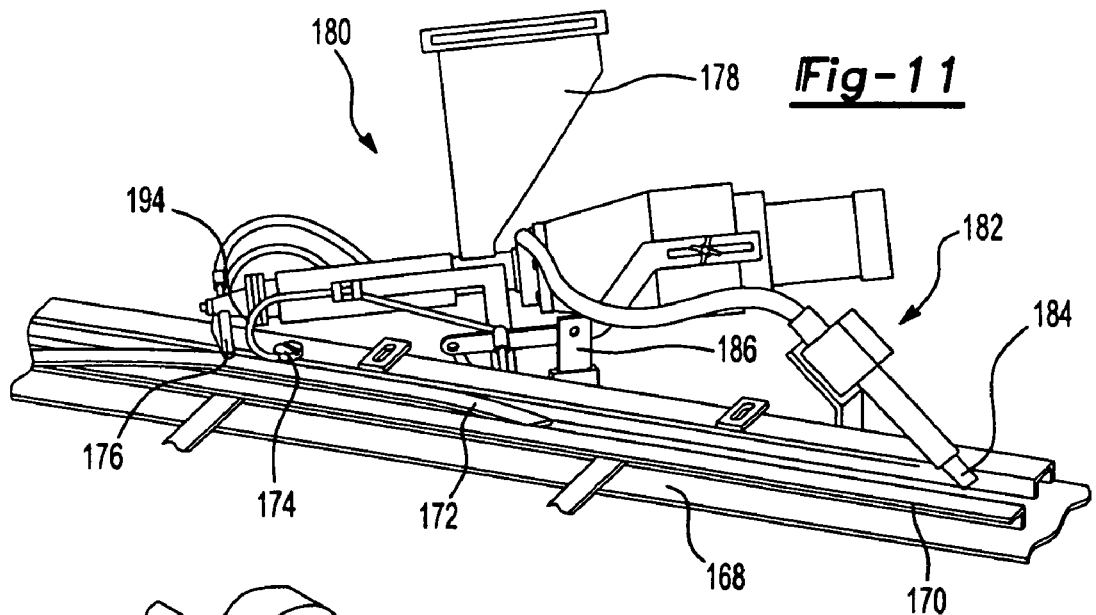
FIG. 11 is a perspective view of an alternate form of the extruder of the present invention, shown in relationship to a conveyor line.
Figure 12:
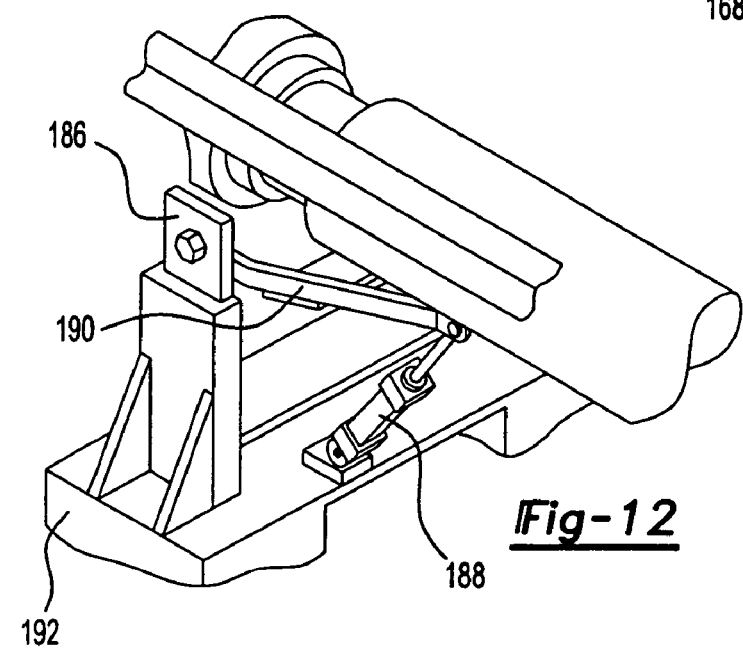
FIG. 12 is a fragmentary rear view of the extruder of FIG. 11.

Attention is now directed to FIGS. 11 and 12, which depict an alternate form of the extruder of the present invention, generally indicated by the numeral 180. The extruder 180 is similar or identical to the previously described extruder in terms of its component parts; only those parts that may be different than those previously described will be discussed here. The extruder 180 is mounted for limited movement about two orthogonal axes, at a stationery position along an assembly line which includes a conveyor 168. Conveyor 168 moves parts such as the metal channel part 172 along a path guided by transversely spaced, stationary feed guides 170. Feed guides 170 precisely control the traverse positioning of the part 172 as it passes by the extruder 180.

The extruder 180 is pivotably mounted on a pair of spaced apart mounting flanges 186 which are secured to a base 192. A pair of forwardly extending arms 190 have one end connected to the structure supporting the extruder 180, and the other end connected to the output shaft of a hydraulic or pneumatic cylinder 188 which functions to raise or lower the extrusion die 176. Counter weights, may be mounted on the opposite end of the extruder 180, as required, to achieve proper balance. A batch type hopper 178 is provided on the extruder 180 to supply pellets or other solid forms of sealant material. A hot air source (e.g., a blower) 182 is mounted up-stream from the extrusion die 176 to apply hot air at a desired temperature via the exit nozzle 184 to preheat the part 172. Other heating mechanisms, such as those identified elsewhere herein may also be employed as desired.

A guide shoe 174 mounted on a guide arm 194 of the extruder 180 is adapted to be received within a groove or channel in the part 192 and functions to pivot the extruder 180 about an axis (e.g., a vertical axis), depending upon the traverse position of the channel or groove within the part 172. In this manner, the shoe 174 acts as a camming guide to precisely move and locate the extrusion die 176 relative to the part channel so that the bead of sealant material is dispensed in precise registration within the groove or channel within the part 172.

Quality Control

For quality control purposes, it may be desirable to track materials as the materials are fed to the applicators. For instance, it may be desirable to supply batches of material pellets in a particular order to assure that the proper materials are being applied to various components or to assure that the materials being used are less likely to be aged deteriorated. As another example, it may be desirable to track the use of materials to monitor supply of the materials to determine when more materials are needed.

Figure 13:
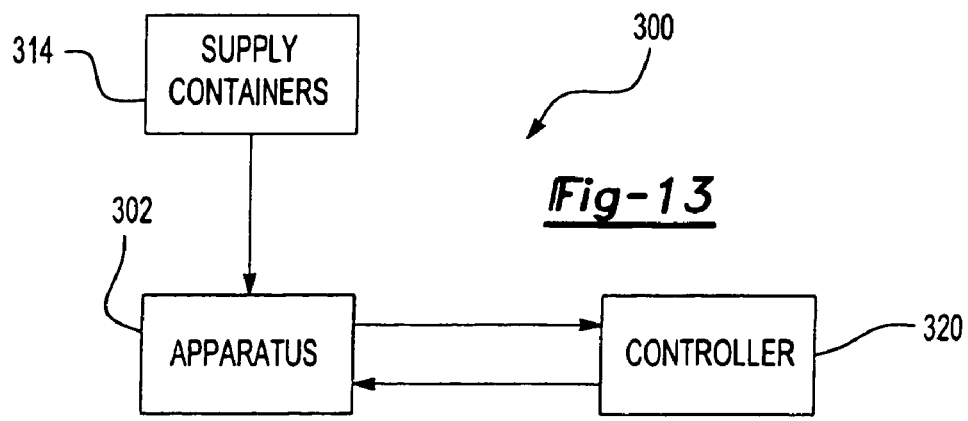
FIG. 13 is a block diagram of an automated system for tracking materials.

Tracking of materials may be accomplished using labels, manual systems, automatic systems and the like. In one exemplary embodiment, and with reference to FIG. 13, a bar code system 300 may be employed. In FIG. 13, portions of an apparatus 302 for supplying flowable materials may include bar code scanner. Preferably, the bar code scanners are positioned upon portions of the apparatus 302 that initially receive flowable materials in pellet form prior to processing. Exemplary positions for such scanners may include positions adjacent supply containers 314 such as the bin 52 of FIG. 3 or positions adjacent the batch hopper 178 of FIG. 11 such that the scanners may scan bar codes affixed to the supply containers preferably prior to introduction of materials from the containers 314 to the apparatus 302.

Preferably, the scanners are in signaling communication with a controller 320 (e.g., a computer or other controller) for signaling to the controller 320 the identification or bar code of any supply container 314 that has been placed in position to feed material to the apparatus 302. The controller 320 may be programmed with data to determine if the desired supply container 314 having the desired bar code has been positioned to supply the apparatus 302 at the desired time. Thus, if an undesired supply container 314 is positioned to supply material, the controller 320 may signal a response. A variety of responses may be signaled such as an audible response (e.g., a horn, bell, tone, or siren), a visual response (e.g., a light, such as a flashing light), a combination thereof or another response. According to one preferred embodiment, the controller 320 is in communication with the apparatus 302 such that the apparatus may be partially or fully shut down if any undesired material is going to be fed to the apparatus 302.

Components and Application of Flowable Materials to the Components

The flowable materials disclosed herein may be applied to a surface of a wide variety of components for several articles of manufacture. As used herein a component may be one of several parts of an article of manufacture or a component may be the only part of an article of manufacture. The surface to which the flowable material is applied may be substantially planar or may be contoured (e.g., curved, angled, arced and the like). In a preferred embodiment, the surface at least partially defines a channel for receiving the flowable materials. In another preferred embodiment, the surface is part of a component of an automotive vehicle. In a highly preferred embodiment, the surface may be part of any stamped metal component that is assembled within an automotive vehicle structure.

It may be desirable to treat the surface of the component prior to applying a flowable material to the surface. The surface may be cleansed of impurities such as dirt, grime, oil and the like prior to application of the flowable material, the surface may be heated prior to application of the flowable material, the surface may be coated prior to application of the flowable material or a combination of treatments may be performed on the surface. Particularly in the automotive industry, many components such as stamped metal components and like contain excess impurities such as oil, which are preferably removed prior to application of a flowable material. Such impurities may preferably be removed by exposing the surfaces of compounds to energy from an energy source.

In one embodiment the surface is cleansed by exposing the surface to a plasma formed by a plasma generator. Plasma generators may generate various plasmas such as a non-thermal or non-equilibrium plasma or a dielectric barrier plasma. The surface is exposed to the plasma and the plasma provides energy to any impurities located upon the surface. In turn, the impurities are burned off, evaporated or otherwise removed from the surface such that the surface is more suitable for receiving a flowable material.

In an alternative embodiment, a laser or flash lamp may be used to expose a surface of a component to energy beams or energy pulses. Preferably, the laser or flash lamp requires relatively low energy input to produce energy pulses with relatively high peak power. One exemplary laser is a Q-switched NdYag laser that can deliver relatively fast high peak power pulses (e.g., pulses having pulse times of around 10 nanoseconds, pulse powers up to and greater than 10 Watts and pulse wavelength of around 1 micron). Preferably, the exemplary laser can deliver such pulses with a frequency of about 100 Hz. It is believed that the energy pulses form an unstable plasma on the surface of a component, wherein the plasma in an effort to stabilize generates a shockwave effect that blasts away grease, grime and other impurities from the surface of the component.

According to another embodiment, the surface of the component may be exposed to light from one or more heat lamps. Preferably, the heat lamps emit light toward the surface of the component wherein the light has a wavelength typical of visible or near infrared light (e.g. around 750 nanometers). The flash lamps remove impurities from the surfaces of the components and the heat lamps may also heat the surfaces of the components. In a highly preferred embodiment, the heat lamps direct light toward a surface of a stamped metal component of an automotive vehicle thereby evaporating the impurities (e.g., particularly oil) that is often present upon the stamped metal components. Additionally in the highly preferred embodiment the surface of the components are exposed to the light from the heat lamps for a period of time that heats the surfaces to a temperature substantially equivalent to the temperature at which flowable material is being applied to the component.

In still another alternative embodiment, a primer may be coated upon a surface of a component before a flowable material is applied to the surface. The primer may be manually or automatically applied to the surface of a component. Preferably, the primer is applied after cleansing the surface of the component. Advantageously, the primer assists flowable materials in adhering to the surfaces of components. In one highly preferred embodiment, the apparatus for applying the flowable materials may be configured with a first nozzle or opening for applying primer and a second opening (e.g., of a die) for applying flowable materials after the primer has been applied.

According to one preferred method of application, the flowable materials may be applied to the surface of a component without pre-heating the component due to the type of flowable material being applied. Preferably, when applying the flowable material in this manner to the surface of a component, the surface is pre-treated or cleansed using one of the methods (e.g., plasma, primer, laser and the like) discussed above. In one preferred embodiment, the flowable material or pellet or even a plurality of pellets (in an uncured state) is generally dry or relatively free of tack to the touch at room temperature.

In certain circumstances, the components may be moved relative to an applicator such that the melt flowable materials emitted from the applicator are properly positioned on the surfaces of the components. As examples, the component may be placed or mounted upon surface or other supports and movement systems such as conveyor belts, robots, robot arms, carousels, turntables and the like for moving the components beneath an applicator. These systems may move the components radially about an axis, along a contoured path, along one or more lines or otherwise. Moreover, these systems may move independently or dependently relative to a robot arm, which may move the applicator and these systems may have a same or different controller from the robot arm. The components may be moved relative to the flowable materials either faster, slower or at substantially the same rate that the flowable materials are emitted from an applicator. The flowable materials may be applied to the components along almost any predetermined path.

Additionally, the flowable materials may be applied to the components in a variety of shapes. As an example, the flowable materials are applied as beads through a die and assume the shape of an opening of the die. By using different dies, different shapes may be achieved. Moreover flowable materials may be applied as a single continuous bead or as a plurality of spaced beads. The beads also may vary in size as desired. For example, cross-sectional areas of the beads may range from about 1 mm$^2$ up to about 1000 mm$^2$ and more preferably from about 10 mm$^2$ to about 500 mm$^2$ and still more preferably from about 100 mm$^2$ to about 300 mm$^2$.

According to one embodiment, it may be desirable for the flowable materials to maintain certain chemical or physical properties, referred to herein as pre-assembly properties, for relatively large intervals of time between application of the flowable materials to a component and assembly of the component to an article of manufacture. After assembly, however, it may be desirable for the flowable materials to exhibit other physical properties referred to herein as post-assembly properties. Flowable materials are provided according to the present invention wherein the materials applied to the components exhibit properties such as non-tackiness and the like, shortly after they are initially applied to the components. In this manner the flowable materials may be applied to the components in a condition suitable for transport (i.e., the components can be placed adjacent or in contact with each other or other components without the flowable materials adhering or otherwise attaching to adjacent components). Thereafter, the flowable materials can be triggered by heat, chemicals or other stimulus to change the chemical or physical properties of the flowable materials during or after the time that the components upon which the flowable materials reside are assembled within an article of manufacture. The chemical or physical properties after triggering may include adhesivity, expansion and the like.

It is contemplated that the flowable material 20 is applied in a visco-elastic state which can easily and uniformly be applied to an exterior surface of the components in a relatively clean manner where it hardens and bonds. Once the material is applied to a component in a desired shape and pattern, the material cools at the ambient temperature found in a manufacturing facility which allows the material to return to its original solid or dry chemical state thereby bonding and adhering the material to the external surface of the component. The component is then integrated into an article of manufacture such as an automotive vehicle for application of heat such as from the e-coat process as well as other paint operation cycles commonly found in an automotive manufacturing facility. The material is allowed to expand, thereby chemically cross-linking the material on the external surfaces of adjacent components of the article of manufacture.

According to one highly preferred embodiment, the flowable material is a plastic adhesive that is non-tacky below a first temperature of, for example, around 40 degrees Celsius but exhibits tackiness when heated above the first temperature and exhibits an even higher degree of tackiness at a second higher temperature, which is around those temperature exhibited by a typical e-coat process as discussed above. Thus, the plastic adhesive can be applied to the components at temperatures between 40 degrees Celsius and 180 degrees Celsius and the adhesive will adhere to the components adequately for the adhesive to be transported but without any high degree of deformation of the flowable material. Preferably, the flowable material is still substantially in its green or non-activated/non-cured state. Thereafter, the adhesive may be cooled or partially cured to temperatures below around 40 degrees such that the component and the adhesive may be transported without the adhesive adhering to other objects, which it may come into contact with. Then, the component may be assembled within an article of manufacture and the temperature of the adhesive may be elevated to the second temperature so that the component is adhesively secured as a component of the article of manufacture once the adhesive is again cooled or finally cured. Such an adhesive provides an advantage over other adhesives since it doesn't typically sag, run, wash away or get displaced during processing and handling.

It has been found that structural attachment may be best achieved when the material is selected from the group consisting of product designations L-5204, L-5205, L-5206, L-5207, L-5208, L-5209, L-5214, L-5222 and L-8000 sold by L&L Products, Inc. of Romeo, Mich. For semi-structural attachments, best results were achieved when the material is selected from the group consisting of product designations L-4100, L-4200, L-4000, L-2100, L-1066, L-2106, and L-2108 sold by L&L Products, Inc. of Romeo, Mich.

There are many components suitable for receiving flowable materials according to the present invention. The flowable materials may be applied to metal surfaces of components, coated or uncoated, painted or unpainted, welded or unwelded. In preferred embodiments, the flowable materials are applied to components of automotive vehicles such as door beams, closure panels such as trunk lids or hood lids, roof bows, fuel filler doors, exterior trim, vehicle A-pillars. The flowable materials may also be applied in an automotive vehicle roof ditch, upon emblems or within a water management trough surrounding the trunk space of a vehicle. Additionally, the flowable materials may be applied to suspension components, hangers, brackets and the like for systems such as exhaust systems. Other components include hem flanges, emblems and the like. Moreover, the flowable materials may be applied to components in need of dampening, sealing or corrosion protection.

The materials may be applied to fill seal or other occupy various holes or openings within vehicles such as rat holes, space between dissimilar metals, notches and the like. According to preferred embodiments, the material may extend across holes, openings or other gaps without sagging.

Figure 14:
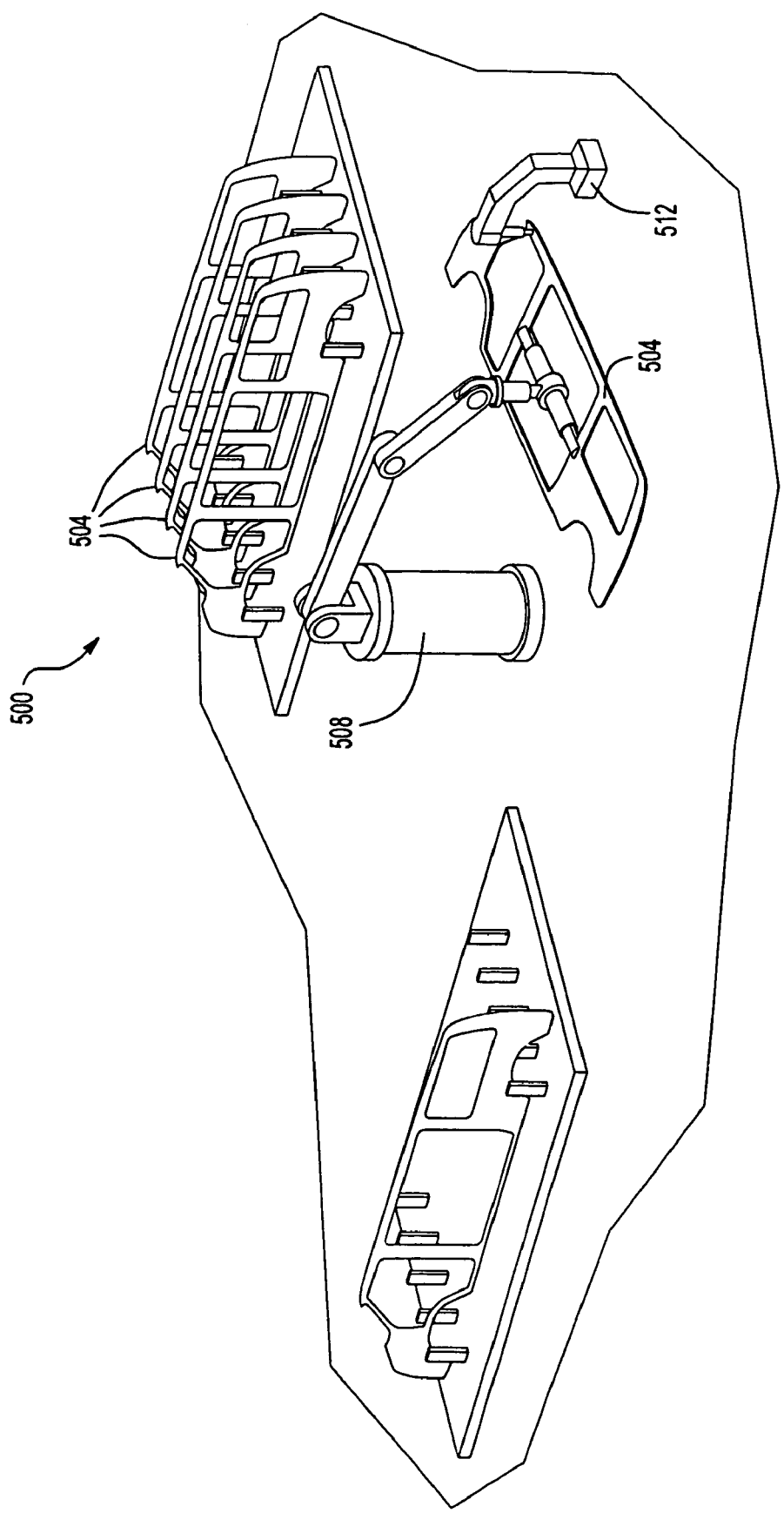
FIG. 14 is an overhead view of a system and apparatus for dispensing flowable materials onto panels of automotive vehicles.

According to one embodiment, it is contemplated that flowable materials may be applied to various portions or regions of substantially a whole-body side panel. With reference to FIG. 14, there is illustrated a system 500 for applying flowable materials to whole-body side panels 504 for automotive vehicles. The system 500 includes a robot 508 for moving and otherwise manipulating the side panels 504. The system 500 also includes an apparatus 512 for applying melt-flowable materials. The apparatus 512 includes an applicator (e.g., an extruder) as discussed above. According to one embodiment, the robot 508 has the capability to support the panels 504 and move the panels 504 relative to the apparatus. Preferably, the robot 508 moves at least one of the panels 504 below the applicator of the apparatus 512 according to a predetermined pattern. As the panel 504 is moved, the applicator preferably emit flowable materials at predetermined times such that the flowable materials are applied to the panel 504 at predetermined locations.

To the extent not expressly addressed in the above, it will be appreciated from the claims that follow that any of a number of different combinations of the specifically recited steps or components can be employed and are contemplated by the present invention.

It is recognized, of course, that those skilled in the art may make various modifications or additions to the preferred embodiments chosen to illustrate the invention without departing from the spirit and scope of the present contributions of the art. Accordingly, it is to be understood that the protection sought and to be afforded hereby should be deemed to extend to the subject matter claimed and all equivalents thereof fairly within the scope of the invention.

What is claimed is:

1. A method for applying a flowable material to a component of an article of manufacture, the method comprising:
   providing a first surface of the component; and
   extruding the flowable material upon the first surface in a slightly flowable state, using an extruder including an ectruder screw such that the flowable material wets and adheres to the first surface wherein: i) a controller employs closed loop control to control output of flowable material based upon a metering system that relates screw rotational speed of the extruder and positioning angle of the extruder to the output; ii) the output of the flowable material from the extruder has been experimentally related to the positioning angle of the extruder and the rotational speed of the extruder screw for creating an output profile that is programmed to the controller; iii)

the profile relates the desired amount of flowable material output over time and the desired positioning angle of the extruder, to the desired rotational speed of the extruder screw for a chosen component; iv) as the flowable material is output, data regarding the angle of the extruder and the rotational speed of the extruder screw are monitored via sensors; and v) an amount of torque applied to the extruder screw is either raised, lowered or maintained such that the output of flowable material or the rotational speed of the extruder screw closely mirrors the output profile.

2. A method as in claim 1 wherein the first surface includes at least one contaminant material disposed thereon and the method further comprises treating the first surface of the component for removing the at least one contaminant material therefrom and the step of treating the first surface of the component includes applying a primer to the first surface, washing the first surface or exposing the surface of the component to energy from an energy source for removing the at least one contaminant material from the first surface and wherein the flowable material includes a blowing agent that foams the flowable material at an elevated temperature experienced during an automotive coating process.

3. A method as in claim 1 further comprising:
providing the extruder as a substantially stationary extruder in communication with the supply of the flowable material;
providing a robot adjacent the extruder, the robot capable of attaching to and moving a whole-body side panel of an automotive vehicle in a plurality of directions relative to the stationary extruder;
moving the whole-body side panel of the automotive vehicle according to a predetermined pattern below the extruder during application of the flowable material to the component.

4. A method as in claim 1 wherein the step of extruding the flowable material to the first surface occurs without pre-heating the first surface.

5. A method as in claim 1 wherein the flowable material is an epoxy based flowable material and the flowable material includes an ingredient selected from a solubilizing agent, a low compatibility component, a polar ingredient or an ingredient modified with an adhesion promoter and wherein the flowable material has a base resin with a narrow molecular weight distribution.

6. A method as in claim 1 further comprising assembling the component to the article of manufacture wherein the article of manufacture is an automotive vehicle wherein the component is a part of the automotive vehicle selected from a door beam, a closure panel, a trunk lid, a hood lid, a roof bow, a fuel filler door, exterior trim or a vehicle pillar.

7. A method for applying a flowable material to a component of an article of manufacture, the method comprising:
providing a first surface of the component;
extruding the flowable material upon the first surface in a slightly flowable state, using an extruder including an ectruder screw such that the flowable material wets and adheres to the first surface wherein a controller employs closed loop control to control output of flowable material based upon a metering system that relates screw rotational speed of the extruder screw to the output;
heating the surface of the component prior to applying the flowable material to the surface wherein the step of heating the surface includes exposing the surface to a lamp, exposing the surface to a blower, exposing the surface to a flame or combinations thereof;
transporting the component along with a plurality of other components wherein the flowable material is substantially tack-free at temperatures near room temperature; and
assembling the component to the article of manufacture wherein the article of manufacture is an automotive vehicle;
wherein the step of extruding the flowable material includes extruding the flowable material with an automated apparatus, the automated apparatus including:
i) a supply of the flowable material, the flowable material being provided as pellets in a container;
ii) an extruder in communication with the supply of flowable material for receiving the pellets, the extruder capable of intermixing the pellets of flowable material into a viscoelastic state and dispensing the flowable material, the extruder including the rotatable screw for dispensing the flowable material; and
iii) a system for moving the extruder or the component during dispensing of the flowable material;
wherein the controller is in communication with the extruder and the system and wherein the extruder includes a heating element for heating the flowable material to a desired temperature and wherein the component is formed of a metal selected from steel, aluminum, or stamped metal and wherein the controller is a programmable logic controller in communication with the extruder, the programmable logic controller programmed with a profile that relates an output rate of flowable material to a position angle of the extruder and a rotational speed of the extruder screw and wherein the programmable logic controller employs closed loop control in conjunction with the profile to set the output rate at a desired level.

8. A method as in claim 7 wherein the extruder includes a nozzle arrangement including an extrusion die through which material is extruded from the extruder to the component and wherein the extrusion die is attached to the extruder with a quick change attachment device selected from a quick nut and bolt fastener, a hydraulic quick connect fastener or a male/female quick connect fastener and further wherein the extruder die includes a plurality of openings for emitting a plurality of beads of flowable material.

9. A method as in claim 7 wherein the extruder is configured to dispense the flowable material upon the component within a tolerance of less than 3 millimeters upon a surface of the component.

10. A method as in claim 7 wherein the system includes a robot arm, a conveyor or a carousel for moving the component and the apparatus includes a source of vacuum pressure for moving pellets from the container to the extruder.

11. A method for applying a flowable material to a component of an article of manufacture, the method comprising:
providing a first surface of the component; and
extruding the flowable material upon the first surface in a slightly flowable state such, using an extruder including an extruder screw that the flowable material wets and adheres to the first surface wherein:
i. a controller employs closed loop control to control output of flowable material based upon a metering system that relates screw rotational speed of the extruder screw to the output; and
ii. the controller is programmed to reverse a direction of rotation of the extruder screw for retracting the flowable material a short distance after an application of the flowable material to the component; and iii. a screw bearing assembly is associated with the extruder, the assembly having a first thrust bearing and a second thrust bearing, wherein the first and second thrust bearings act in opposite directions.

12. A method as in claim 11 further comprising:

transporting the component along with a plurality of other components wherein the flowable material is substantially tack-free at temperatures near room temperature; and assembling the component to the article of manufacture wherein the article of manufacture is an automotive vehicle.

13. A method as in claim 12 wherein the flowable material is an epoxy based flowable material and the flowable material includes an ingredient selected from a solubilizing agent, a low compatibility component, a polar ingredient or an ingredient modified with an adhesion promoter and wherein the flowable material has a base resin with a narrow molecular weight distribution and wherein the flowable material includes a blowing agent that foams the flowable material at an elevated temperature experienced during an automotive coating process.

14. A method as in claim 13 wherein the step of extruding the flowable material includes extruding the flowable material with an automated apparatus, the automated apparatus including:

i) a supply of the flowable material, the flowable material being provided as pellets in a container;

ii) an extruder in communication with the supply of flowable material for receiving the pellets, the extruder capable of intermixing the pellets of flowable material into a viscoelastic state and dispensing the flowable material, the extruder including the rotatable screw for dispensing the flowable material; and iii) a system for moving the extruder or the component during dispensing of the flowable material;

wherein the controller is in communication with the extruder and the system and wherein the extruder includes a heating element for heating the flowable material to a desired temperature.

15. A method as in claim 14 wherein the component is formed of a metal selected from steel, aluminum, or stamped metal.

16. A method as in claim 11 wherein the output of the flowable material from the extruder has been experimentally related to the positioning angle of the extruder and the rotational speed of the extruder screw for creating an output profile that is programmed to the controller and wherein, as the flowable material is output, an amount of torque applied to the extruder screw is either raised, lowered or maintained such that the output of flowable material or the rotational speed of the extruder screw closely mirrors the output profile.

17. A method for applying a flowable material to a component of an article of manufacture, the method comprising:

providing a first surface of the component: and extruding the flowable material upon the first surface in a slightly flowable state, using an extruder including an extruder screw such that the flowable material wets and adheres to the first surface wherein:

i. a controller employs closed loop control to control output of flowable material based upon a metering system that relates screw rotational speed of the extruder screw to the output; and ii. the controller is programmed to reverse a direction of rotation of the extruder screw for retracting the flowable material a short distance after an application of the flowable material to the component:

wherein the output of the flowable material from the extruder has been experimentally related to the positioning angle of the extruder and the rotational speed of the extruder screw for creating an output profile that is programmed to the controller and wherein, as the flowable material is output, an amount of torque applied to the extruder screw is either raised, lowered or maintained such that the output of flowable material or the rotational speed of the extruder screw closely mirrors the output profile.

* * * * *